(12) United States Patent
Wakai

(10) Patent No.: US 7,725,823 B2
(45) Date of Patent: May 25, 2010

(54) INFORMATION PROCESSING APPARATUS CAPABLE OF DISPLAYING SCHEDULER

(75) Inventor: Masanori Wakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 10/848,658

(22) Filed: May 18, 2004

(65) Prior Publication Data

US 2004/0268252 A1    Dec. 30, 2004

(30) Foreign Application Priority Data

May 27, 2003  (JP)  ............... 2003-149603

(51) Int. Cl.
  *G06F 17/00*  (2006.01)
(52) U.S. Cl. ...................... 715/273; 715/808
(58) Field of Classification Search ................ 715/864, 715/500, 526, 273, 200, 252, 254–255, 800, 715/815, 808; 345/835

See application file for complete search history.

(56) References Cited

U.S. PATENT DOCUMENTS

| | | | | |
|---|---|---|---|---|
| 6,012,037 A * | 1/2000 | Yoshikawa | ................ | 705/8 |
| 6,157,363 A * | 12/2000 | Haine | ................ | 345/629 |
| 6,229,542 B1 * | 5/2001 | Miller | ................ | 715/782 |
| 6,297,795 B1 * | 10/2001 | Kato et al. | ................ | 345/684 |
| 6,459,440 B1 * | 10/2002 | Monnes et al. | ................ | 715/808 |
| 6,512,529 B1 * | 1/2003 | Janssen et al. | ................ | 715/790 |
| 6,556,217 B1 * | 4/2003 | Makipaa et al. | ................ | 345/667 |
| 6,638,313 B1 * | 10/2003 | Freeman et al. | ................ | 715/500.1 |
| 6,657,638 B2 * | 12/2003 | Kamba | ................ | 345/632 |
| 6,661,438 B1 * | 12/2003 | Shiraishi et al. | ................ | 715/835 |
| 6,856,962 B2 * | 2/2005 | Yonemitsu | ................ | 705/8 |
| 6,904,570 B2 * | 6/2005 | Foote et al. | ................ | 715/863 |
| 6,924,797 B1 * | 8/2005 | MacPhail | ................ | 715/700 |
| 6,928,617 B2 * | 8/2005 | Druyan et al. | ................ | 715/760 |
| 6,959,425 B1 * | 10/2005 | Krauklis | ................ | 715/864 |
| 6,965,388 B2 * | 11/2005 | Vale et al. | ................ | 345/660 |
| 6,976,226 B1 * | 12/2005 | Strong et al. | ................ | 715/788 |
| 7,020,849 B1 * | 3/2006 | Chen | ................ | 715/864 |
| 7,035,170 B2 * | 4/2006 | Narayanaswami et al. | .. | 368/223 |
| 7,043,276 B2 * | 5/2006 | Kokubo | ................ | 455/566 |
| 2002/0032696 A1 * | 3/2002 | Takiguchi et al. | ........ | 707/500.1 |
| 2003/0119564 A1 * | 6/2003 | Seok | ................ | 455/566 |

(Continued)

FOREIGN PATENT DOCUMENTS

JP    2000-155667 A    6/1990

(Continued)

*Primary Examiner*—Stephen S Hong
*Assistant Examiner*—Manglesh M Patel
(74) *Attorney, Agent, or Firm*—Canon U.S.A. Inc., I.P. Division

(57) ABSTRACT

In an information processing apparatus, even when a large volume of data is displayed in a limited display area in which the number of data items that can be displayed at once is restricted, rough searching for data and specific identification of data are facilitated. In the information processing apparatus, the number of data items to be displayed is determined. When the number of data items to be displayed is less than or equal to a predetermined number of data items that can be displayed in a display area, the data items are displayed in a first mode. If the number of data items to be displayed is greater than the predetermined number, the data items are displayed in a second mode.

8 Claims, 39 Drawing Sheets

U.S. PATENT DOCUMENTS

| | | | |
|---|---|---|---|
| 2004/0032427 A1* | 2/2004 | Kekki et al. | 345/764 |
| 2004/0139396 A1* | 7/2004 | Gelernter et al. | 715/515 |
| 2005/0138568 A1* | 6/2005 | Gilfix | 715/788 |
| 2005/0140574 A1* | 6/2005 | Tamura | 345/9 |
| 2006/0236233 A1* | 10/2006 | Ozawa et al. | 715/517 |

FOREIGN PATENT DOCUMENTS

JP 9-305363 A 11/1997

* cited by examiner

FIG. 8

| Time | Object |
|---|---|
| ⋮ | ⋮ |
| 11/16 10:20 | /Table/Jisseki01.csv |
| 11/16 12:30 | /Map/CompanyA.jpg |
| 11/16 13:00 | /Present/Present05.pst |
| 11/16 14:10 | /Photo/Meishi121.jpg |
| 11/16 14:12 | /Contact/Contact233.cnt |
| 11/16 15:01 | /Photo/photo001.jpg |
| 11/16 15:02 | /Photo/photo002.jpg |
| 11/16 15:13 | /Photo/photo003.jpg |
| 11/16 15:37 | /Photo/photo004.jpg |
| 11/16 15:58 | /Photo/photo005.jpg |
| ⋮ | ⋮ |

FIG. 9

| Kind | Object |
|---|---|
| .csv | /System/Table.jpg |
| .cnt | /System/Contact.jpg |

| start | end | summary |
|---|---|---|
| ⋮ | ⋮ | ⋮ |
| 11/16 10:00 | 12:00 | Section meeting |
| 11/16 13:00 | 14:00 | Presentation by company A |
| 11/16 15:00 | 17:00 | Visit exhibition |
| 11/16 18:00 | 20:00 | Newcomer welcome party |
| ⋮ | ⋮ | ⋮ |

FIG. 36 (PRIOR ART)

▼ Third week of November ▲

| | 11(Sun.) | 12(Mon.) | 13(Tues.) | 14(Wed.) | 15(Thurs.) | 16(Fri.) | 17(Sat.) |
|---|---|---|---|---|---|---|---|
| 9:00 | | | | | | | |
| 10:00 | | | | | | Section meeting | |
| 11:00 | | | | | | | |
| 12:00 | | | | | | | |
| 13:00 | | | | | | Presentation by company A | |
| 14:00 | | | | | | | |
| 15:00 | | | | | | Visit exhibition | |
| 16:00 | | | | | | | |
| 17:00 | | | | | | | |

| | November 16 (Fri.) | |
|---|---|---|
| 9:00 | | |
| 10:00 | Section meeting | |
| 11:00 | | |
| 12:00 | | |
| 13:00 | Presentation by company A | |
| 14:00 | | |
| 15:00 | Visit exhibition | |
| 16:00 | | |
| 17:00 | | |

▼ Third week of November ▲

| | 11(Sun.) | 12(Mon.) | 13(Tues.) | 14(Wed.) | 15(Thurs.) | 16(Fri.) | 17(Sat.) |
|---|---|---|---|---|---|---|---|
| 9:00 | | | | | | | |
| 10:00 | | | | | | Section meeting | |
| 11:00 | | | | | | | |
| 12:00 | | | | | | | |
| 13:00 | | | | | | Presentation by company A | |
| 14:00 | | | | | | | |
| 15:00 | | | | | | Visit exhibition | |
| 16:00 | | | | | | | |
| 17:00 | | | | | | | |

500a  500b

INFORMATION PROCESSING APPARATUS CAPABLE OF DISPLAYING SCHEDULER

BACKGROUND OF THE INVENTION

1. Field of the Invention

The present invention relates to information processing apparatuses that are capable of displaying schedulers. More specifically, the present invention relates to an information processing apparatus with an improved ease of visually recognizing data displayed along a time axis of a scheduler on a display.

2. Description of the Related Art

Techniques for displaying data in a display area of a limited size, for example, displaying data along a time axis of a scheduler on a display, have been generally known. Schedule data can be displayed in a calendar format by a schedule displaying apparatus implementing such techniques.

FIG. 34 is a flowchart showing an example of a calendar-format displaying process according to a related art.

Referring to FIG. 34, in step S101, a calendar frame for displaying schedule data is displayed in a format. Various formats are described later with reference to FIGS. 36 and 37. In step S102, schedule data to be displayed in the calendar frame displayed in step S101 is obtained. Then, in step S103, the object of processing is initialized to the beginning of a schedule data set obtained in step S102. In step S104, it is determined whether or not to exit the procedure.

If it is determined in step S104 not to exit the procedure, in step S105, the schedule data of the object is displayed at an appropriate position of the screen displayed in step S101. In step S106, the procedure proceeds to a next object. The procedure then returns to step S104, and procedure is repeated.

When the processing for all the objects has been finished and it is determined in step S104 to exit the procedure, the procedure is exited.

FIG. 35 is a diagram showing an example of a schedule database storing a schedule to be obtained in step S102.

Each item of the schedule data stored in the schedule database includes a start time, an end time, and a summary. In obtaining the schedule data in step S102, schedule data of a specified period is obtained.

FIGS. 36 and 37 are illustrations showing examples of screens displayed in the calendar-format displaying process in step S101.

FIG. 36 shows an example of a display screen showing a weekly schedule on a time axis. A schedule summary 100a is displayed, and scheduled events are shown in relation to periods. FIG. 37 shows an example of a display screen showing a time-based daily schedule. A schedule summary 100a is displayed, and scheduled events are shown in relation to periods.

As described above, according to the related art, schedule data associated with periods can be efficiently searched for and manipulated in a calendar format with an improved visibility in relation to time. It was not possible, however, to display information of processing relating to operations performed by a user, events that occurred, plans, and the like, in a calendar format. Although such information is associated with periods similarly to schedule data, efficient searching and manipulation of such information has not been possible.

In order to solve the problem described above, techniques for displaying other data together with schedule data have been proposed.

FIG. 38 is a flowchart showing an example of a calendar-format displaying process according to the proposed techniques.

Referring to FIG. 38, in step S501, a calendar frame for displaying schedule data is displayed in various modes described later with reference to FIGS. 39 and 40. In step S502, schedule data that is to be displayed in the calendar frame displayed in step S501 is obtained. In step S503, the object of processing is initialized to the beginning of the schedule data set obtained in step S502. In step S504, it is determined whether or not to exit the procedure.

If it is determined in step S504 not to exit the procedure, in step S505, the schedule data obtained is displayed at the appropriate position of the screen displayed in the calendar-frame displaying process in step S501. In step S506, the procedure proceeds to a next object. The procedure then returns to step S504, and the procedure is repeated.

When the processing for all the objects has been finished and it is determined in step S504 to exit the procedure, processing information to be displayed in the calendar frame displayed in step S501 is obtained in step S507. In step S508, the object is initialized to the beginning of the data. In step S509, it is determined whether or not to exit the procedure.

If it is determined in step S509 not to exit the procedure, in step S510, processing information of the object is displayed at an appropriate position of the screen displayed in step S501. In step S511, the procedure proceeds to a next object. The procedure then returns to step S509, and the procedure is repeated.

When the processing for all of the objects has been finished and it is determined in step S509 to exit the procedure, the procedure is exited.

FIGS. 39 and 40 are illustrations showing examples of screens displayed in the calendar-format displaying process according to the related art.

FIG. 39 is an example of a display screen showing a time-based weekly schedule. A schedule summary 500a and processing information 500b are displayed, and scheduled events are shown in relation to periods. FIG. 40 shows an example of a display screen showing a time-based daily schedule. A schedule summary 500a and processing information 500b are shown, and scheduled events are shown in relation to periods.

As described above, according to the proposed art, other data is displayed together with schedule data on a scheduler screen, so that the efficiency of data searching is improved.

Other related art include techniques for manipulating terminal data while grasping an overview of data classified in a hierarchical manner, as disclosed, for example, in Japanese Patent Laid-Open No. 9-305363, and techniques for improving visibility by converting original data into a display mode optimal for a display terminal, as disclosed, for example, in Japanese Patent Laid-Open No. 2000-155667.

According to the proposed techniques, however, in a display mode in which data is shown in a display area of a limited size on the time axis, for example, in a scheduler screen, the number of data items that can be displayed at once is restricted. This has been a factor that deteriorates visibility in cases where a large number of data items are displayed.

Furthermore, according to Japanese Patent Laid-Open No. 9-305363, mentioned above, although it is possible to manipulate terminal data while grasping an overview of data classified in a hierarchical manner, it is impossible to identify data while grasping an overview of data arranged on a time axis.

Furthermore, according to Japanese Patent Laid-Open No. 2000-155667, mentioned above, although the ease of visual recognition is improved by converting original data into a display mode optimal for a display terminal, it is impossible to identify data while grasping an overview of data arranged on a time axis.

SUMMARY OF THE INVENTION

In view of the problems described above, the present invention provides an information processing apparatus that readily allows rough searching for data and specific identification of data even when a large volume of data is displayed in a limited display area in which the number of data items that can be displayed at once is restricted.

According to an aspect of the present invention, an information processing apparatus is provided. The information processing apparatus includes: a determining unit for determining whether the number of data items to be displayed is greater than a predetermined number; a first displaying unit for displaying the data items in a display area in a first display mode when the number of data items to be displayed is less than or equal to the predetermined number; and a second displaying unit for displaying the data items in the display area in a second display mode when the number of data items to be displayed is greater than the predetermined number.

According to another aspect of the present invention, an information processing apparatus is provided. The information processing apparatus includes: a scheduler-format data displaying device for displaying a plurality of data items in a plurality of frames displayed in a scheduler format on a display screen; and a display-scale changing device for changing a display scale of each of the frames in accordance with the number of data items to be displayed.

According to another aspect of the present invention, a data displaying method for an information processing apparatus is provided. The method includes: determining whether a number of data items to be displayed is greater than a predetermined number; displaying the data items in a display area in a first display mode when the number of data items to be displayed is less than or equal to the predetermined number; and displaying the data items in the display area in a second display mode when the number of data items to be displayed is greater than the predetermined number.

According to yet another aspect of the present invention, a data displaying method for an information processing apparatus is provided. The method includes: displaying a plurality of data items in a plurality of frames displayed in a scheduler format on a display screen; and changing a display scale of each of the frames in accordance with the number of data items to be displayed.

According to the present invention, even when a plurality of data items exceeding a predetermined number is displayed in a display area, ease of visual recognition is maintained. This facilitates rough searching for data and specific identification of data. Accordingly, a specific data item can be identified while grasping an overview of data.

Further features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing a database in accordance with the first embodiment.

FIG. 9 is a diagram showing a data-kind association table in accordance with the first embodiment.

FIG. 35 is a diagram showing a schedule database in accordance with the related art.

FIG. 36 is an illustration of a screen showing a time-based weekly schedule in accordance with the related art.

FIG. 37 is an illustration of a screen showing a time-based daily schedule in accordance with the related art.

FIG. 39 is an illustration of a screen showing a conventional time-based weekly schedule.

DESCRIPTION OF THE PREFERRED EMBODIMENTS

Exemplary embodiments of the present invention are described below with reference to the drawings.

First Embodiment

Hardware Configuration of Information Processing Apparatus

Figure 1:
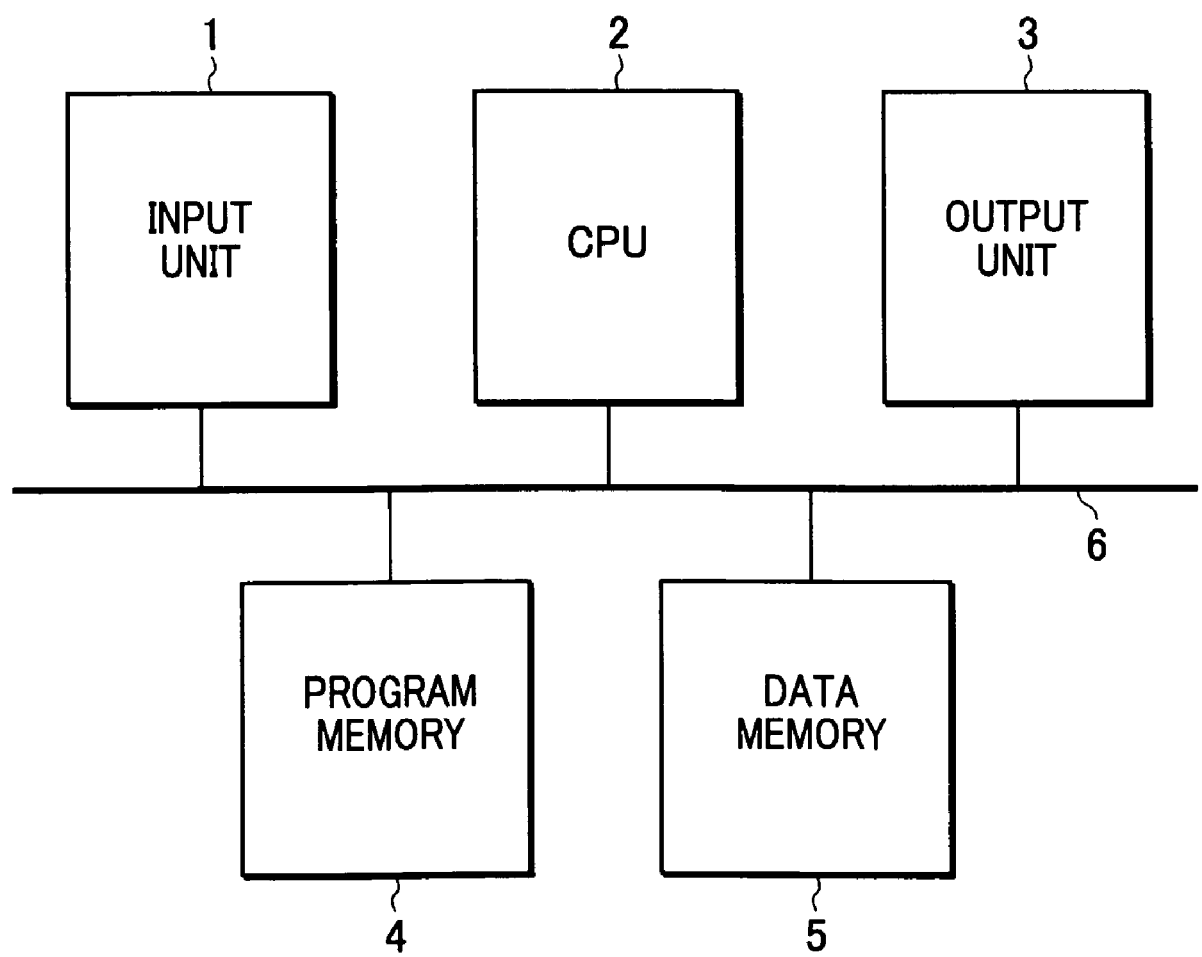
FIG. 1 is a block diagram showing the hardware configuration of information processing apparatuses according to embodiments of the present invention.

FIG. 1 is a block diagram showing the hardware configuration of an information processing apparatus according to a first embodiment of the present invention.

Referring to FIG. 1, an input unit 1 allows input of information (data). A central processing unit (CPU) 2 executes calculations and logical operations, and controls components connected to a bus 6. An output unit 3 allows outputting of information (data). The output unit 3 is, for example, a display such as a liquid crystal display (LCD) or a cathode ray tube (CRT) display, or a recording apparatus such as a printer.

A program memory 4 stores programs for control by the CPU 2, including processing procedures described later with reference to flowcharts. The program memory 4 may be a read-only memory (ROM), or a random access memory (RAM) in which programs are loaded from an external storage device or the like.

A data memory 5 stores data that occurs in various processing operations. The data memory 5 is implemented, for example, by a RAM. Prior to processing, the data memory 5 loads data from a non-volatile external storage medium, or refers to data stored in the storage medium as needed.

The bus 6 includes an address bus for specifying components to be controlled by the CPU 2, a control bus for transmitting control signals for controlling the components, and a data bus for data signals exchanged mutually among the components.

Overall Flow of Processing

Figure 2:
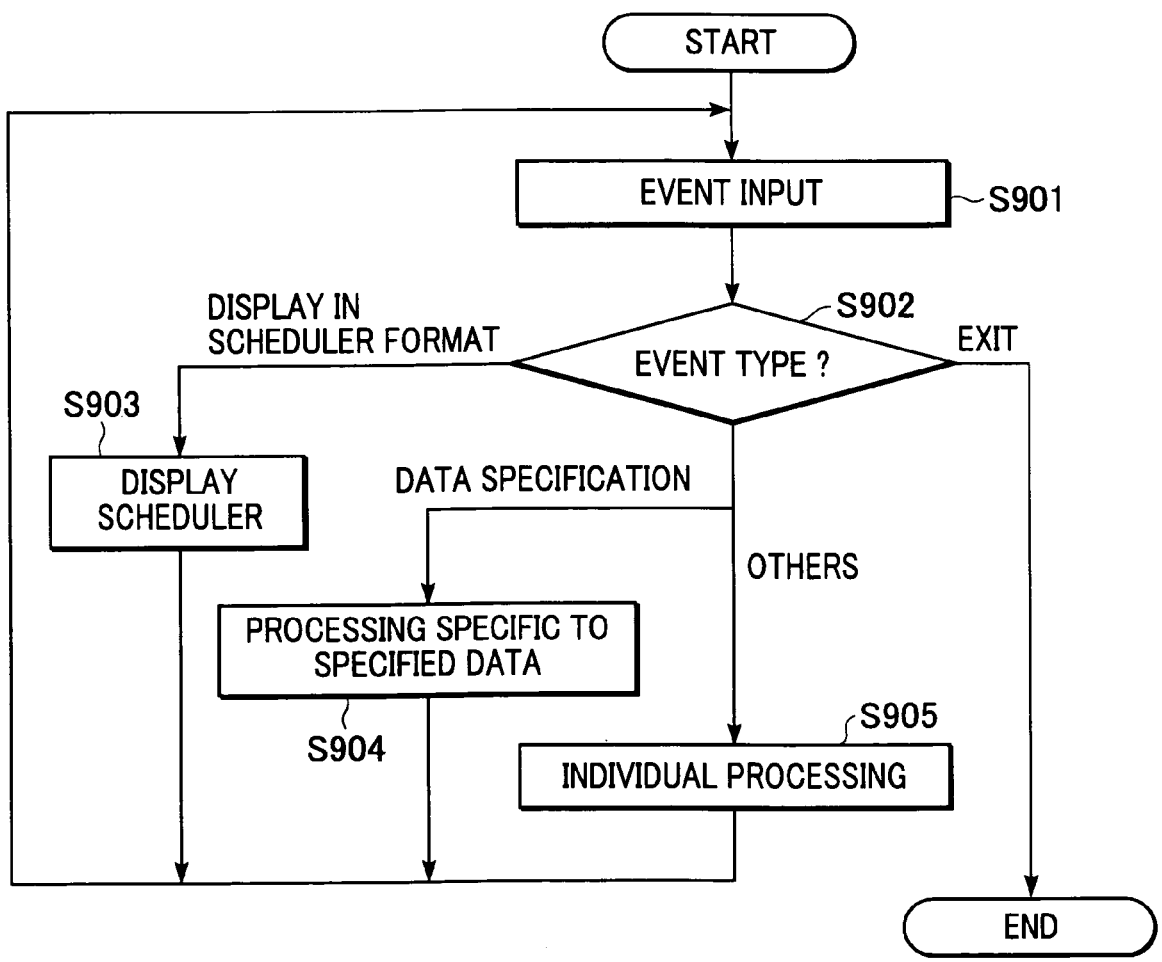
FIG. 2 is a flowchart showing an overall procedure of processing in accordance with a first embodiment of the present invention.

FIG. 2 is a flowchart showing an example of a procedure of overall processing according to the first embodiment.

Referring to FIG. 2, in step S901 an operation performed by a user or an event that occurred is input and detected. The event type is determined in step S902.

Figure 3:
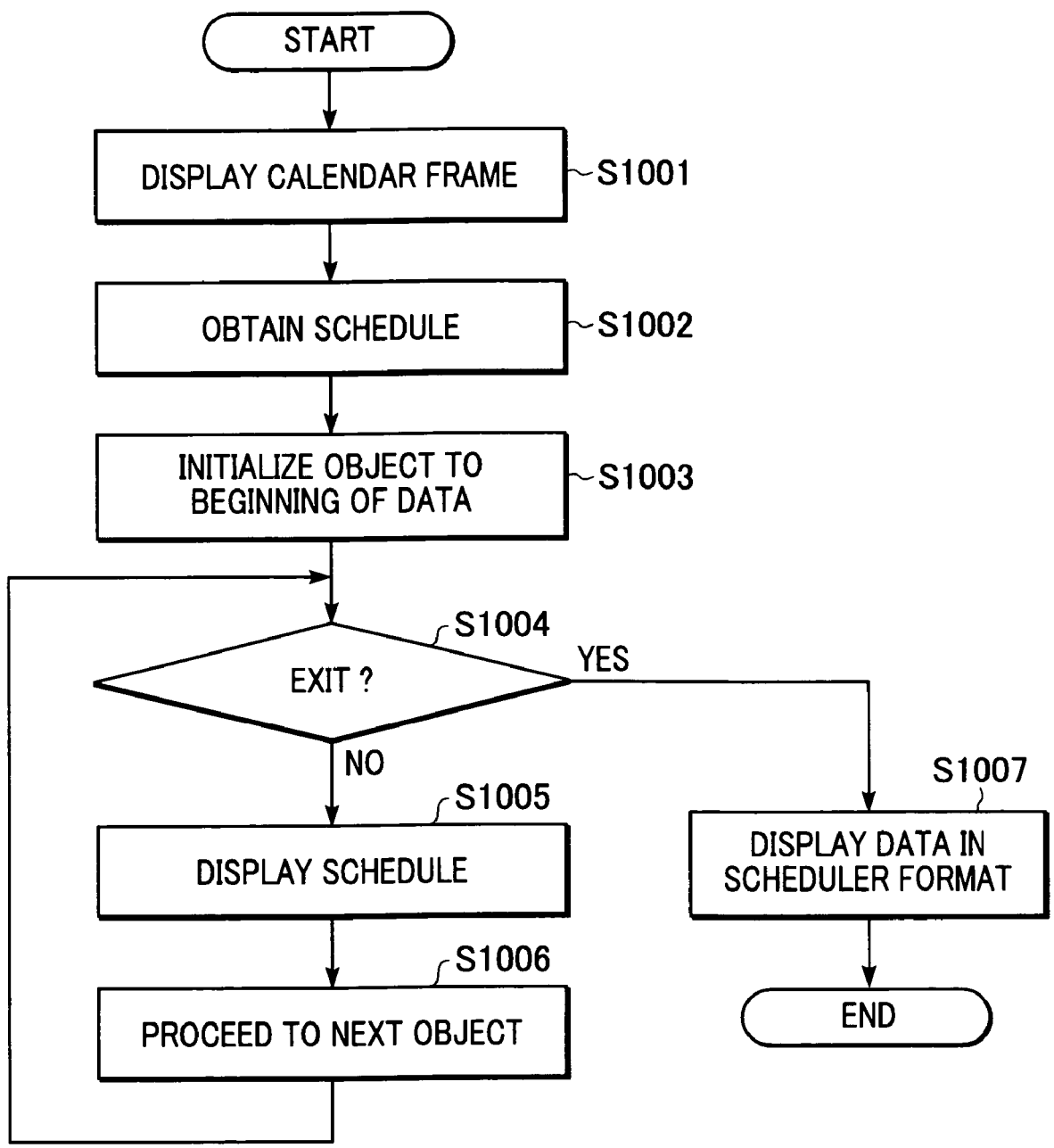
FIG. 3 is a flowchart showing a scheduler displaying process in accordance with the first embodiment.

If it is determined in step S902 that display in a scheduler format has been requested, display scheduler processing is performed in step S903. FIG. 3 describes exemplary display scheduler processing and is described below. The procedure then returns to step S901, and the procedure is repeated (i.e., an input event is detected and processed based on the input event type).

Figure 12:
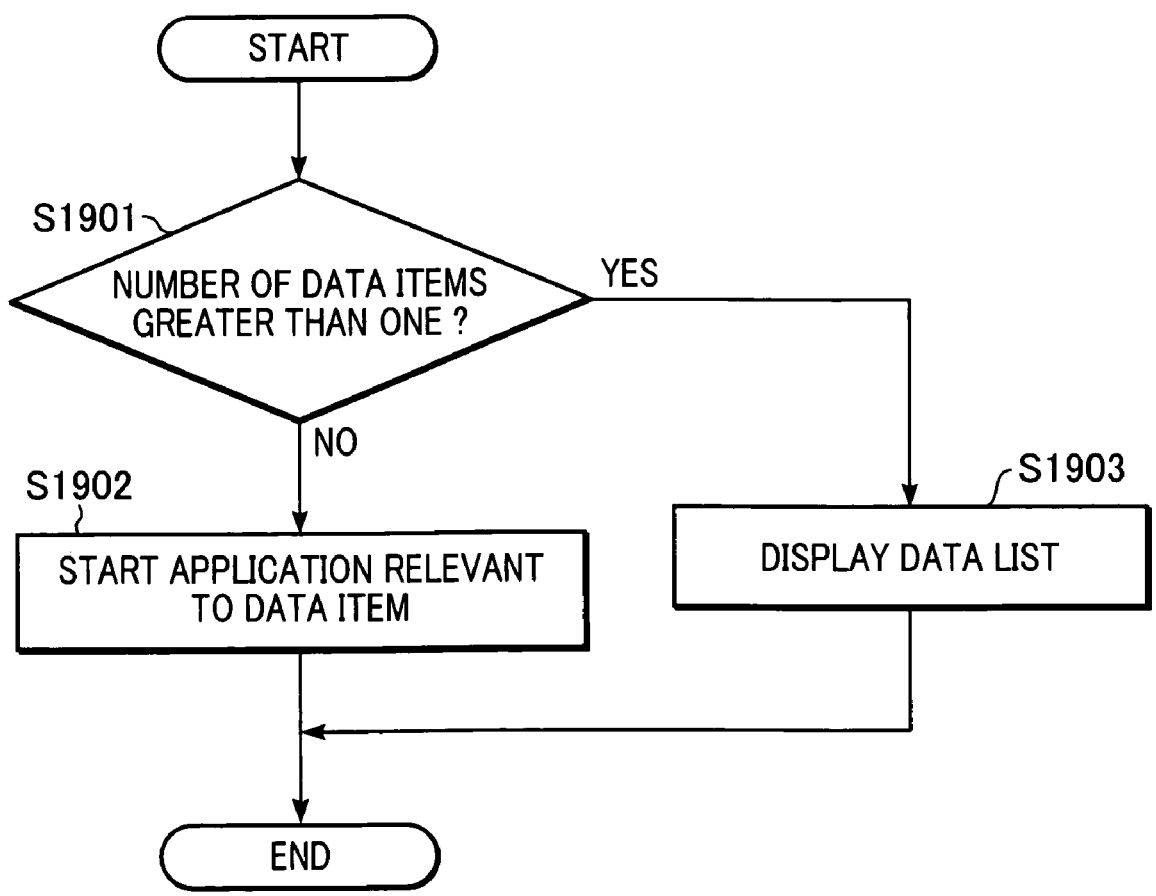
FIG. 12 is a flowchart showing a processing switching process in accordance with a second embodiment of the present invention.

If it is determined in step S902 that data has been specified, processing relevant to the specified data is executed in step S904. FIG. 12 illustrates exemplary processing specific to specified data and is described later with reference to a second embodiment. The procedure then returns to step S901, and the procedure is repeated.

Figure 29:
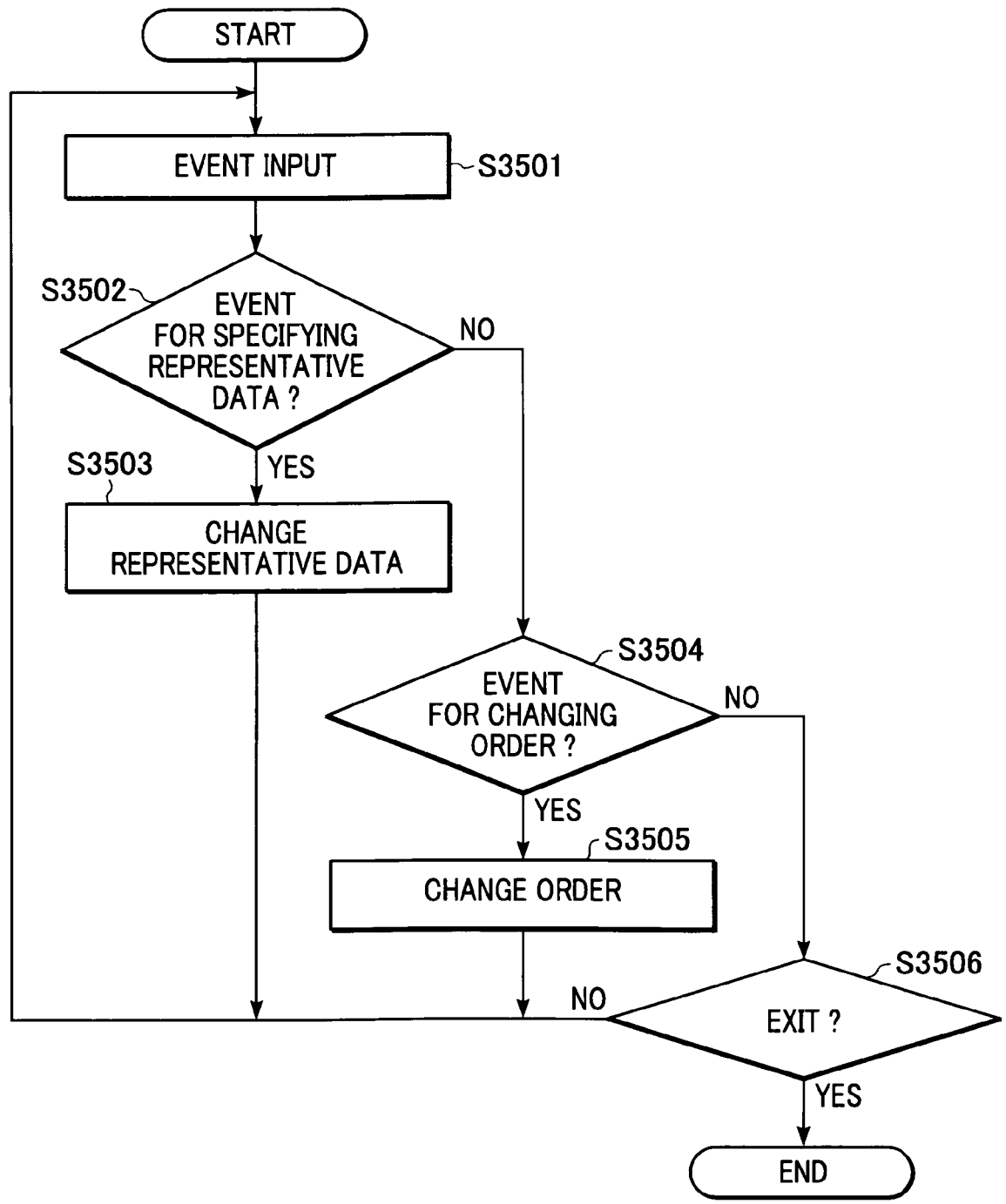
FIG. 29 is a flowchart showing a representative-data specifying process in accordance with the sixth embodiment.

If it is determined in step S902 that other processing has been requested, relevant individual processing is executed in step S905. Exemplary individual processing is shown in FIG. 29 and is described later with reference to a sixth embodiment. The procedure then returns to step S901, and the procedure is repeated.

When it is determined in step S902 that exiting has been requested (i.e., the input event type is an exit request), the procedure is exited.

Scheduler Displaying Process

FIG. 3 is a flowchart showing an example of a scheduler displaying process (S903 of FIG. 2) in accordance with the first embodiment.

Referring to FIG. 3, in step S1001, a calendar frame for displaying schedule data is displayed in one of various modes described later with reference to FIGS. 10 and 11. In step S1002, schedule data to be displayed in the calendar frame displayed in step S1001 is obtained. In step S1003, the object of processing is initialized to the beginning of the schedule data obtained in step S1002. In step S1004, it is determined whether or not to exit the procedure.

If it is determined in step S1004 not to exit the procedure, the procedure proceeds to step S1005 where the schedule data of the object is displayed at an appropriate position of the screen displayed in step S1001. In step S1006, the procedure proceeds to a next object. The procedure then returns to step S1004, and the procedure is repeated.

Figure 4:
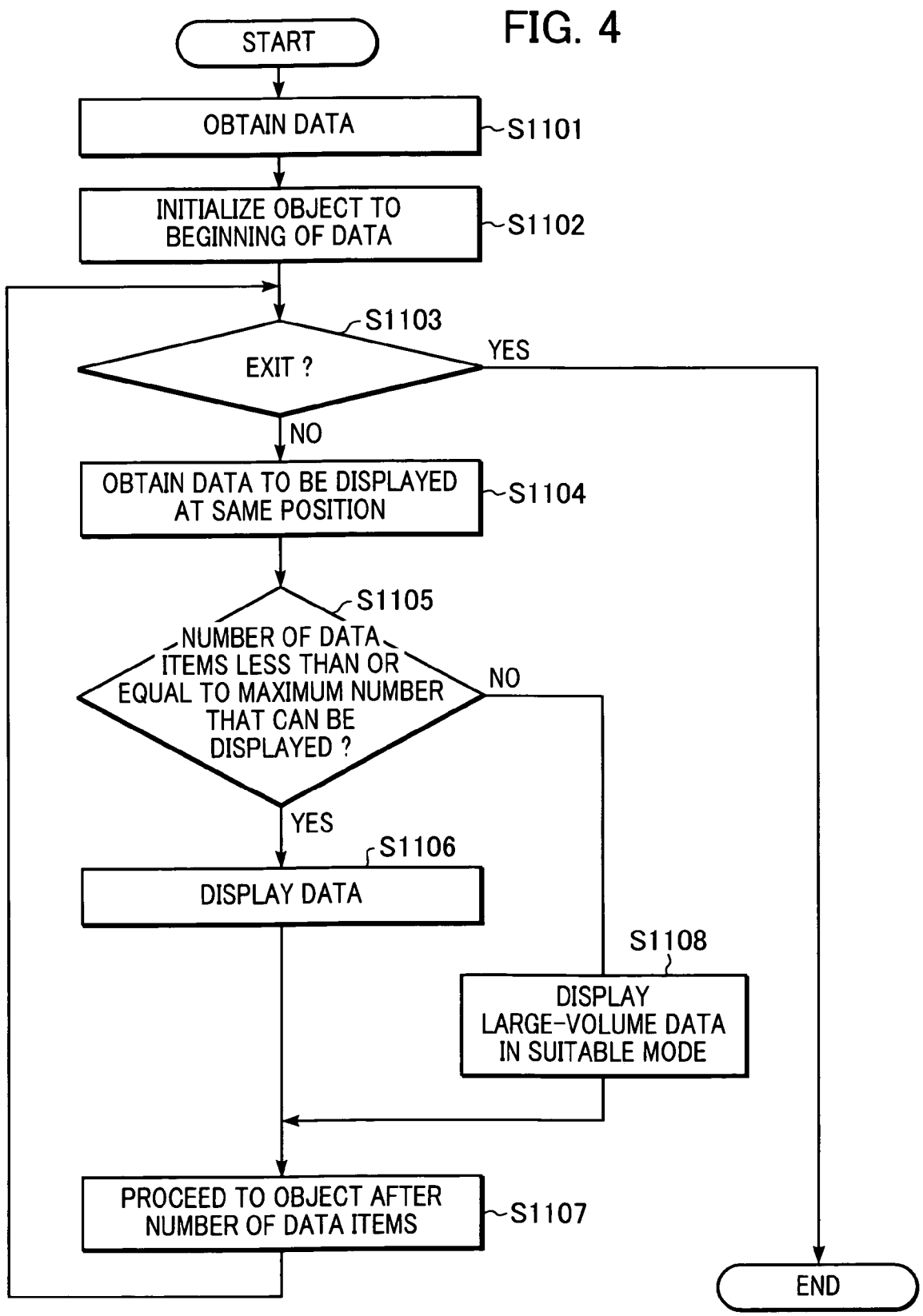
FIG. 4 is a flowchart showing a scheduler-format data displaying process in accordance with the first embodiment.

When processing for all of the objects has been finished and it is determined in step S1004 to exit the procedure, in step S1007, various data is displayed at appropriate positions of the screen displayed in step S1001. FIG. 4 is a flowchart showing an example of a scheduler-format data displaying process (step S1007) and is described next. After displaying the data at appropriate positions of the screen (step S1007), the procedure is exited.

Referring to FIG. 4, all the data that is to be displayed is obtained in step S1101. In step S1102, the object of processing is initialized to the beginning of all of the data obtained. In step S1103, it is determined whether or not to exit the procedure.

If it is determined in step S1103 not to exit the procedure, processing proceeds to step S1104 where data items to be displayed at the same position are obtained. In step S1105, it is determined whether the number of data items obtained is less than or equal to a maximum number of data items that can be displayed.

Figure 5:
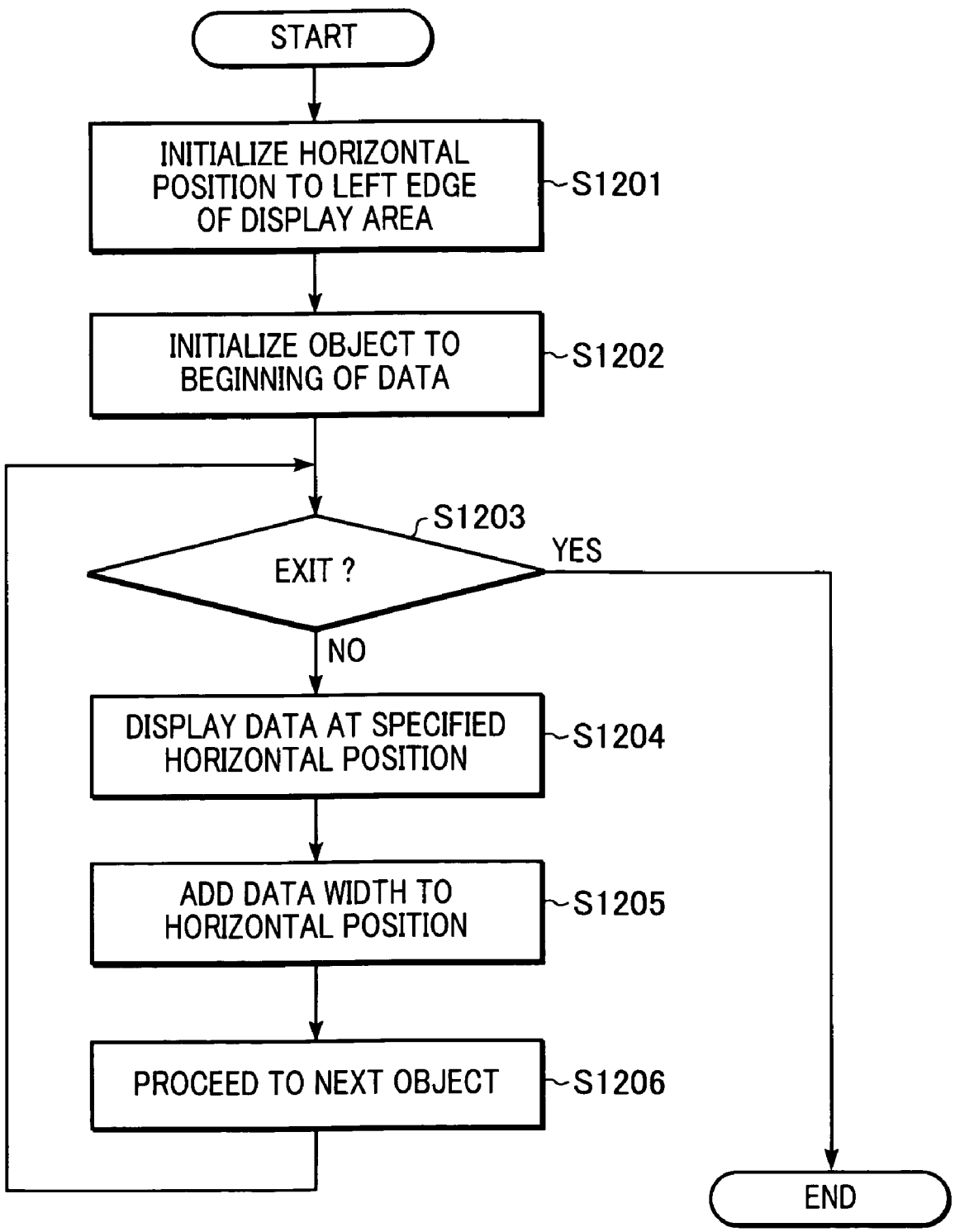
FIG. 5 is a flowchart showing a data displaying process in accordance with the first embodiment.
Figure 6:
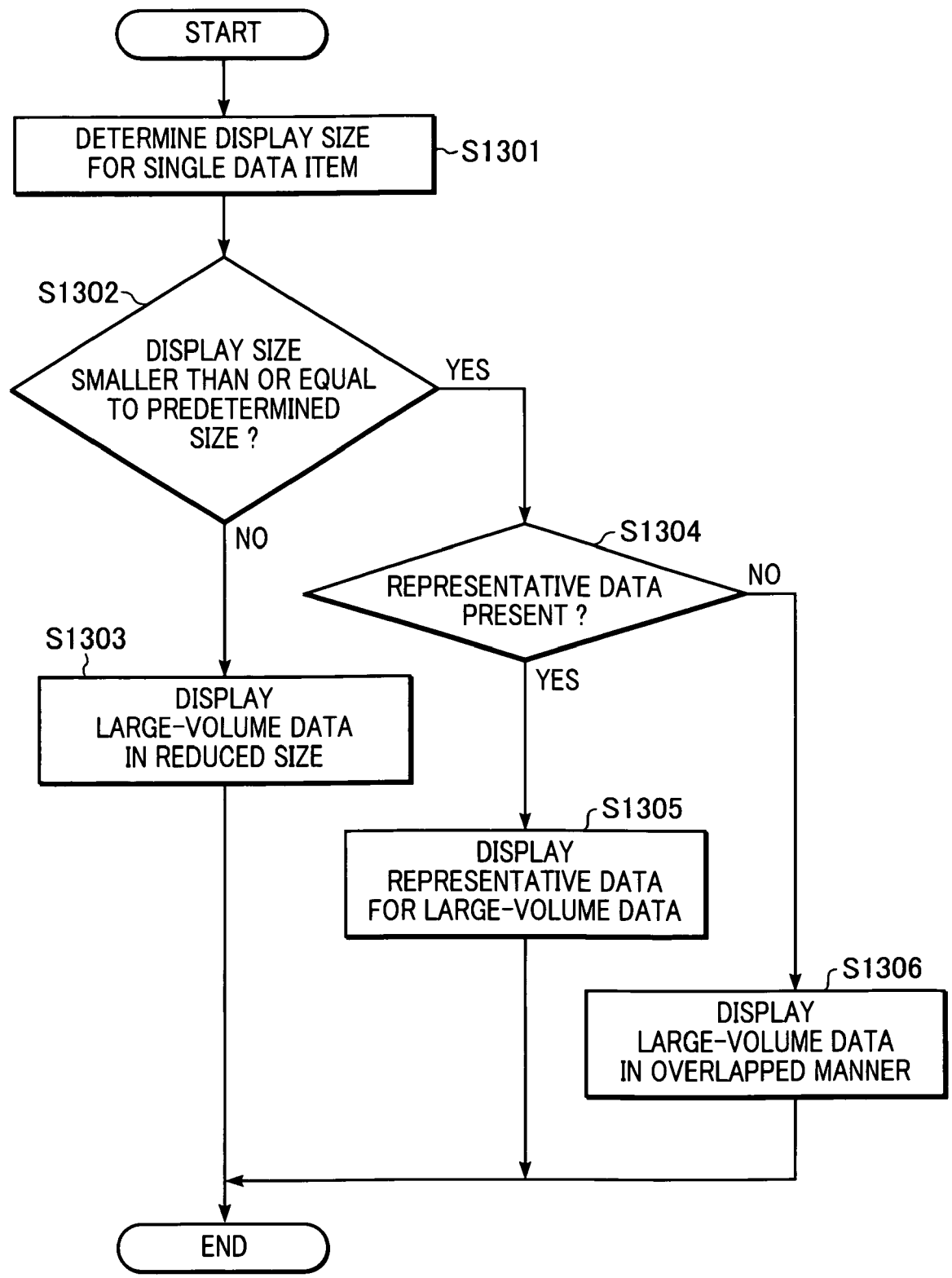
FIG. 6 is a flowchart showing a large-volume-data displaying process in accordance with the first embodiment.

If it is determined in step S1105 that display is possible (i.e., the number of data items obtained is less than or equal to the maximum number of data items that can be displayed), the data items are displayed in a standard format in step S1106. FIG. 5 illustrates an exemplary data display process and is described below. If it is determined that display is not possible (i.e., the number of data items obtained is greater than the maximum number of data items that can be displayed), the data items are displayed in a format suitable for large-volume data in step S1108. An exemplary large-volume data displaying process is shown in FIG. 6 and is described later.

After displaying the data items in a standard format (step S1106) or displaying the data items in a large-volume display mode (step S1108), the object of processing is moved forward by the number of the data items displayed in step S1107. The procedure then returns to step S1103, and the procedure is repeated. If it is determined in step S1103 that the object of processing has reached an end, the procedure is exited.

FIG. 5 is a flowchart showing an example of the standard data displaying process (step S1106 of FIG. 4) in accordance with the first embodiment.

Referring to FIG. 5, in step S1201, the horizontal position where data is to be displayed is initialized to the left edge of an area where display is possible. In step S1202, the object of processing is initialized to the beginning of the data items to be displayed. In step S1203, it is determined whether or not to exit the procedure.

If it is determined in step S1203 not to exit the procedure, in step S1204, the data is displayed at a specified horizontal position. In step S1205, an amount corresponding to the number of data items displayed is added to the horizontal position, i.e., the data width is added to the horizontal position. In step S1206, the procedure proceeds to a next object. The procedure then returns to step S1203, and the procedure is repeated. If it is determined in step S1203 that the processing for all the objects has been finished, the procedure is exited.

FIG. 6 is a flowchart showing an example of the large-volume-data displaying process (step S1108 of FIG. 4) in accordance with the first embodiment.

Figure 32:
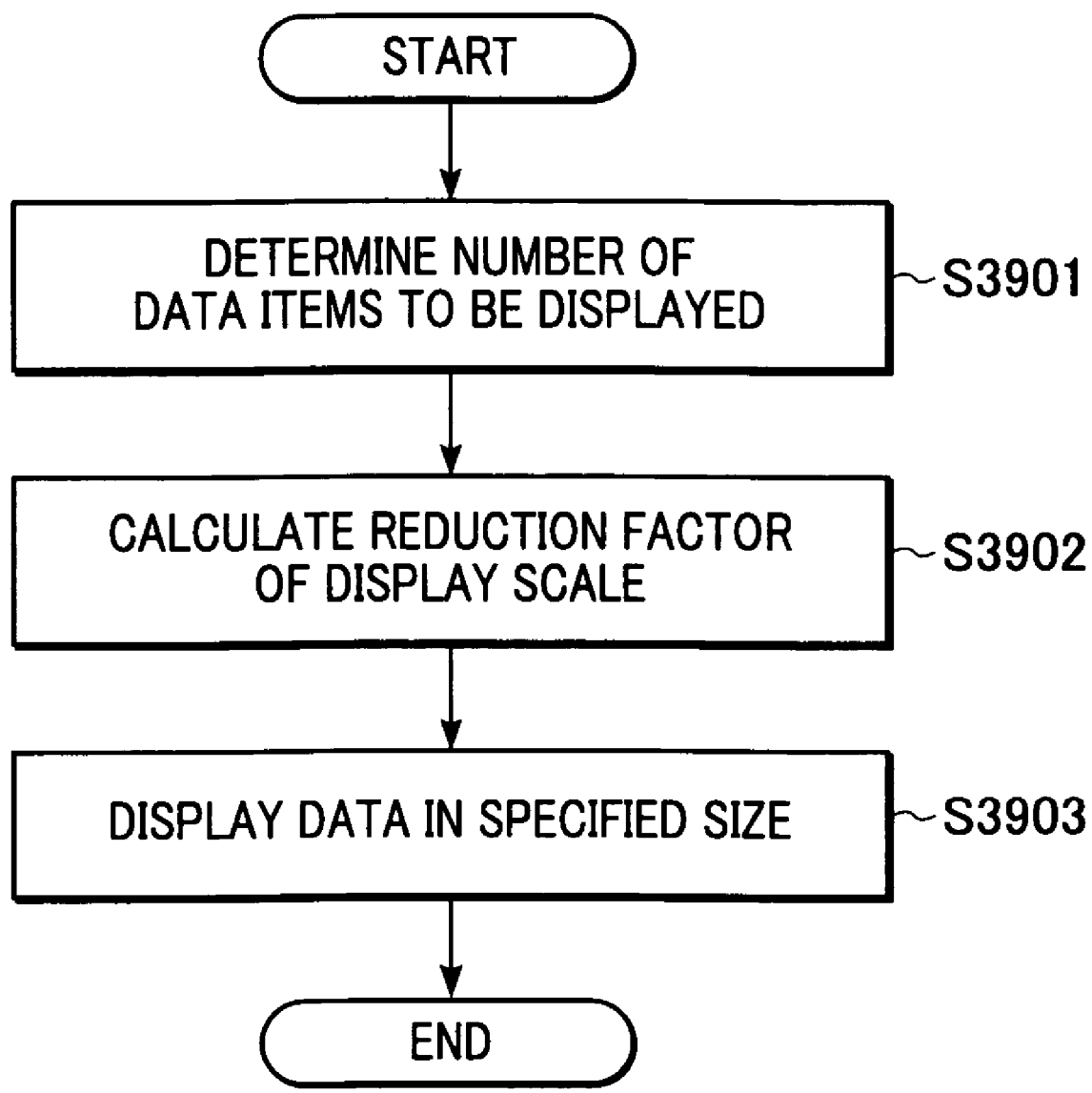
FIG. 32 is a flowchart showing a large-volume-data reduced size displaying process in accordance with a seventh embodiment of the present invention.

Referring to FIG. 6, in step S1301, a size of a single data item in a case where all of the data items to be displayed are displayed in an allowable display area is determined. In step S1302 it is determined if the display size of a single data item is less than or equal to a predetermined size. If it is determined in step S1302 that the display size of a single data item is larger than a predetermined size, all the data items to be displayed are displayed in a reduced size in step S1303. FIG. 32 illustrates exemplary processing for displaying large-volume data in a reduced size and is described later with reference to a seventh embodiment. After displaying the large-volume data in a reduced size, the procedure is exited.

Figure 26:
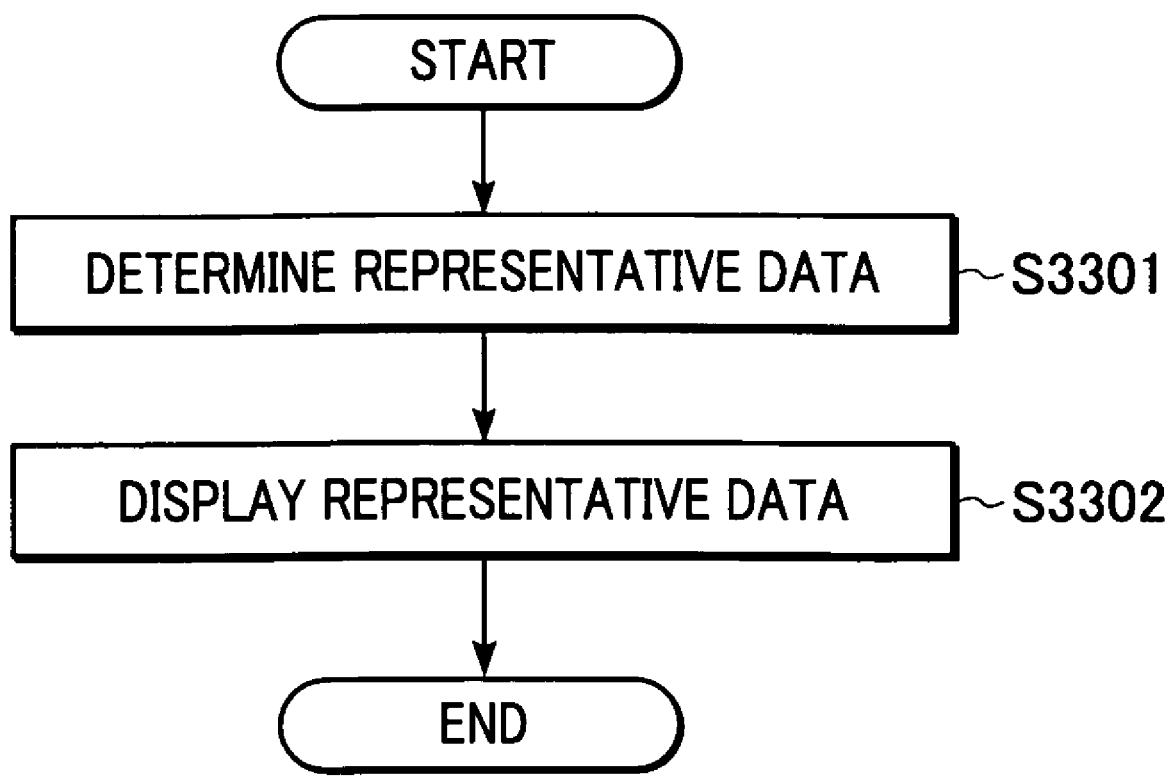
FIG. 26 is a flowchart showing a large-volume-data representative displaying process in accordance with a sixth embodiment of the present invention.

If it is determined in step S1302 that the display size of a single data item is within the predetermined size, it is determined in step S1304 whether representative data is present. If it is determined that representative data is present, in step S1305, the representative data is displayed instead of displaying all the data items to be displayed. FIG. 26 illustrates exemplary processing for displaying representative data for large-volume data and is described later with reference to the sixth embodiment. After displaying representative data for the large-volume data, the procedure is exited.

Figure 7:
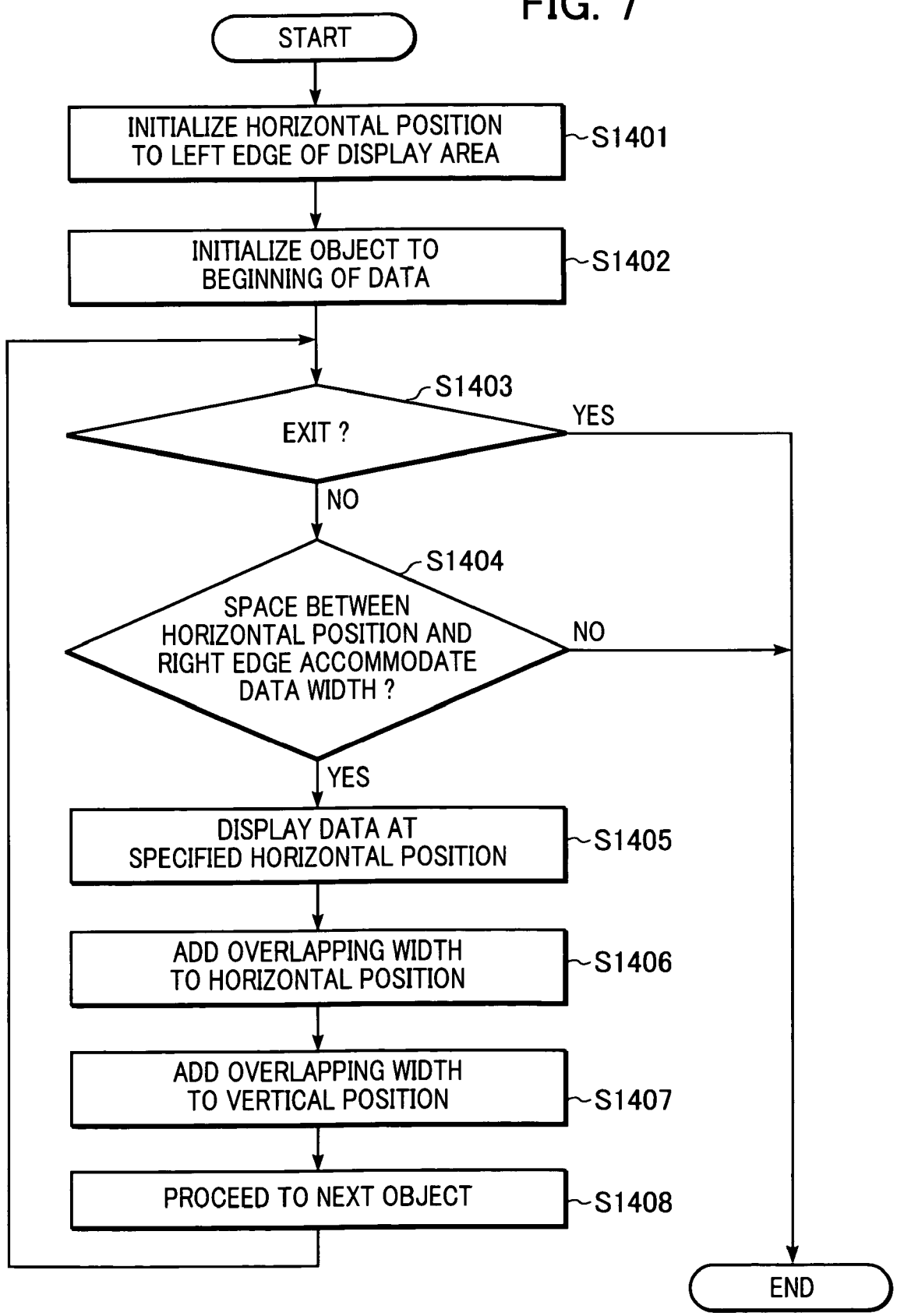
FIG. 7 is a flowchart showing a large-volume-data overlapped displaying process in accordance with the first embodiment.

If it is determined in step S1304 that representative data is not present, the data items to be displayed are displayed in an overlapped manner in step S1306. FIG. 7 illustrates an exemplary procedure for displaying large-volume-data in an overlapped manned and is described next. After displaying the large-volume data in an overlapped manner, the procedure is exited.

Large-Volume-Data Overlapped Displaying Process

FIG. 7 is a flowchart showing an example of the large-volume-data overlapped displaying process (step S1306 of FIG. 6) in accordance with the first embodiment.

Referring to FIG. 7, in step S1401, the horizontal position of displaying data is initialized to the left edge of the display area. In step S1402, the object of processing is initialized to the beginning of a set of data items to be displayed. In step S1403, it is determined whether or not to exit the procedure.

If it is determined in step S1403 not to exit the procedure, in step S1404, it is determined whether the horizontal position of the space between the horizontal position for displaying data and the right edge of the display area accommodates the width of a single data item.

If it is determined in step S1404 that a sufficient width for display is remaining, the data is displayed in an overlapping manner. As such, the data is displayed at the specified horizontal position in step S1405. In steps S1406 and S1407, overlapping widths are added to the horizontal position and the vertical position, respectively. In step S1408, the object of processing proceeds to a next object. The procedure then returns to step S1403, and the procedure is repeated.

If it is determined in step S1403 to exit the procedure, or if it is determined in step S1404 that a sufficient width for display is not remaining, the procedure is exited.

Data Obtaining Process

FIG. 8 is a diagram showing an example of a database storing data to be obtained in the data obtaining process (step S1101 of FIG. 4) in accordance with the first embodiment. This database is stored in the data memory 5.

Each data item stored in the database includes a time and an object. Data of a specified period is obtained by the data obtaining process.

Data-Kind Association Table

FIG. 9 is a diagram showing an example of a data-kind association table that can be used in the first embodiment.

Each data item defined in the data-kind association table includes a kind and an object. An object is displayed in a display mode corresponding to a kind associated with the object.

Figure 10:
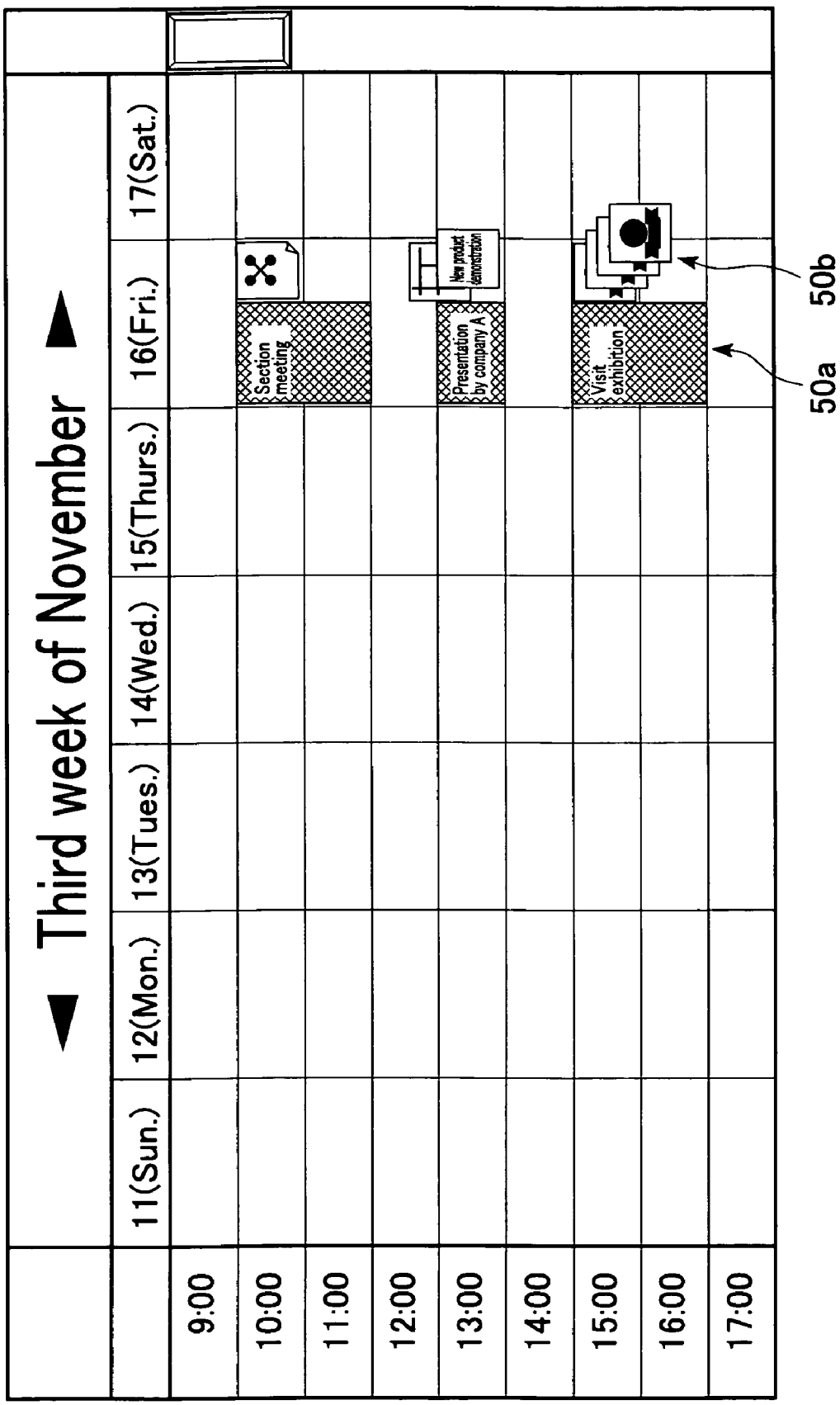
FIG. 10 is an illustration of a screen showing a time-based weekly schedule in accordance with the first embodiment.
Figure 11:
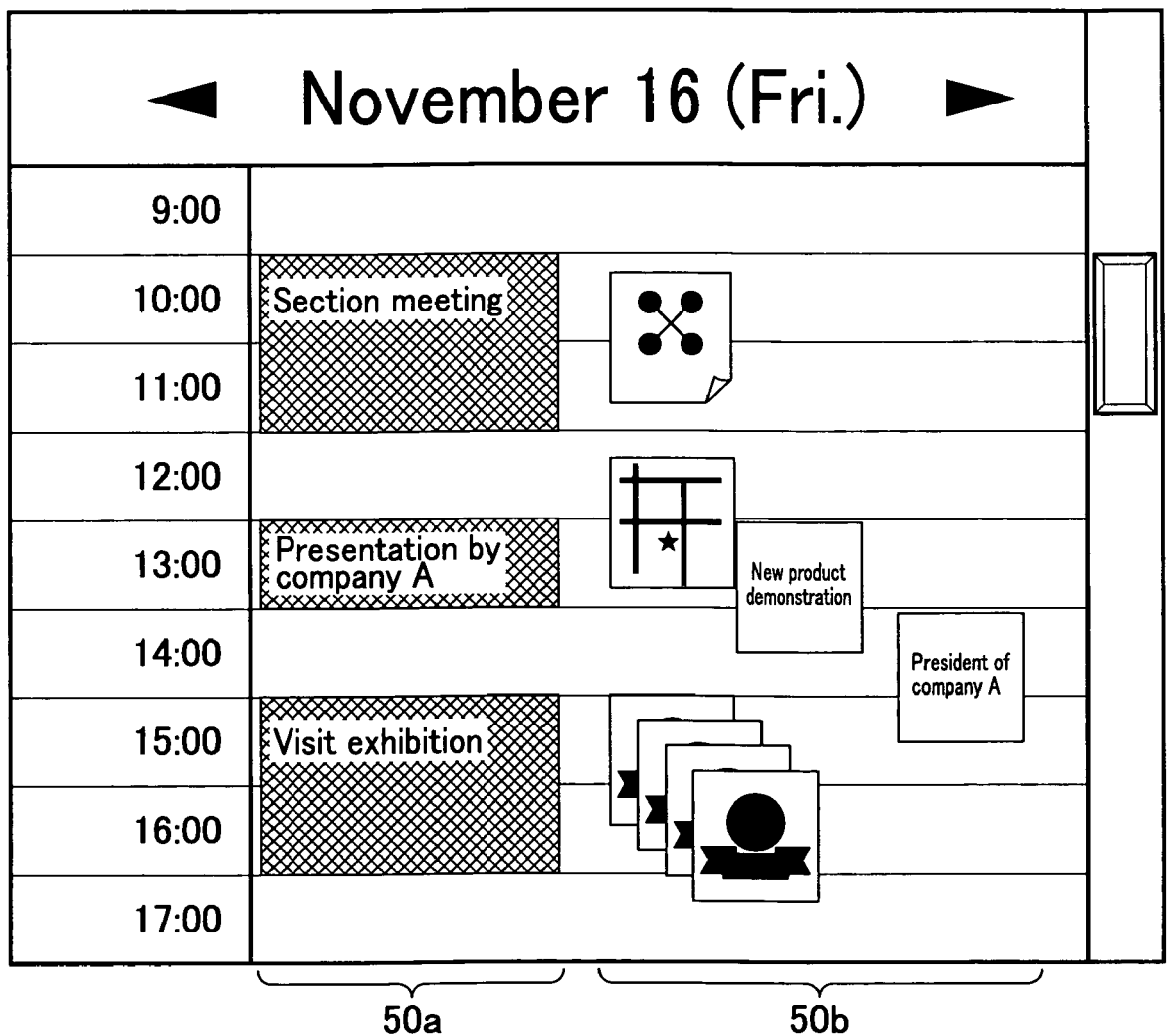
FIG. 11 is an illustration of a screen showing a time-based daily schedule in accordance with the first embodiment.

FIGS. 10 and 11 are diagrams showing examples of screens that are displayed in the scheduler-format data displaying process (step S1007 of FIG. 3) in accordance with the first embodiment.

FIG. 10 is an illustration of a screen showing a time-based weekly schedule. A schedule summary 50a and data 50b are displayed, and scheduled events are shown in relation to periods. FIG. 11 is an illustration of a screen showing a time-based daily schedule. A schedule summary 50a and data 50b are displayed, and scheduled events are shown in relation to periods.

As described above, according to the first embodiment, even when a large volume of data is displayed in a display area of a limited size in which the number of data items that can be displayed at once is restricted, rough searching for desired data is facilitated. In accordance with the first embodiment, this is achieved by displaying data items that can be displayed within a display area in a standard format and displaying data items that can't be displayed within the data area in a large-volume display format. An exemplary format for large-volume display in accordance with the first embodiment is display of data items in an overlapping manner as shown in FIGS. 10 and 11. Thus, the presence of a large volume of data can be readily recognized.

Second Embodiment

Processing Specific to Specified Data

FIG. 12 is a flowchart showing an example of processing specific to specified data as a second embodiment of the present invention. This processing is executed in step S904 of the overall procedure of processing shown in FIG. 2.

Figure 13:
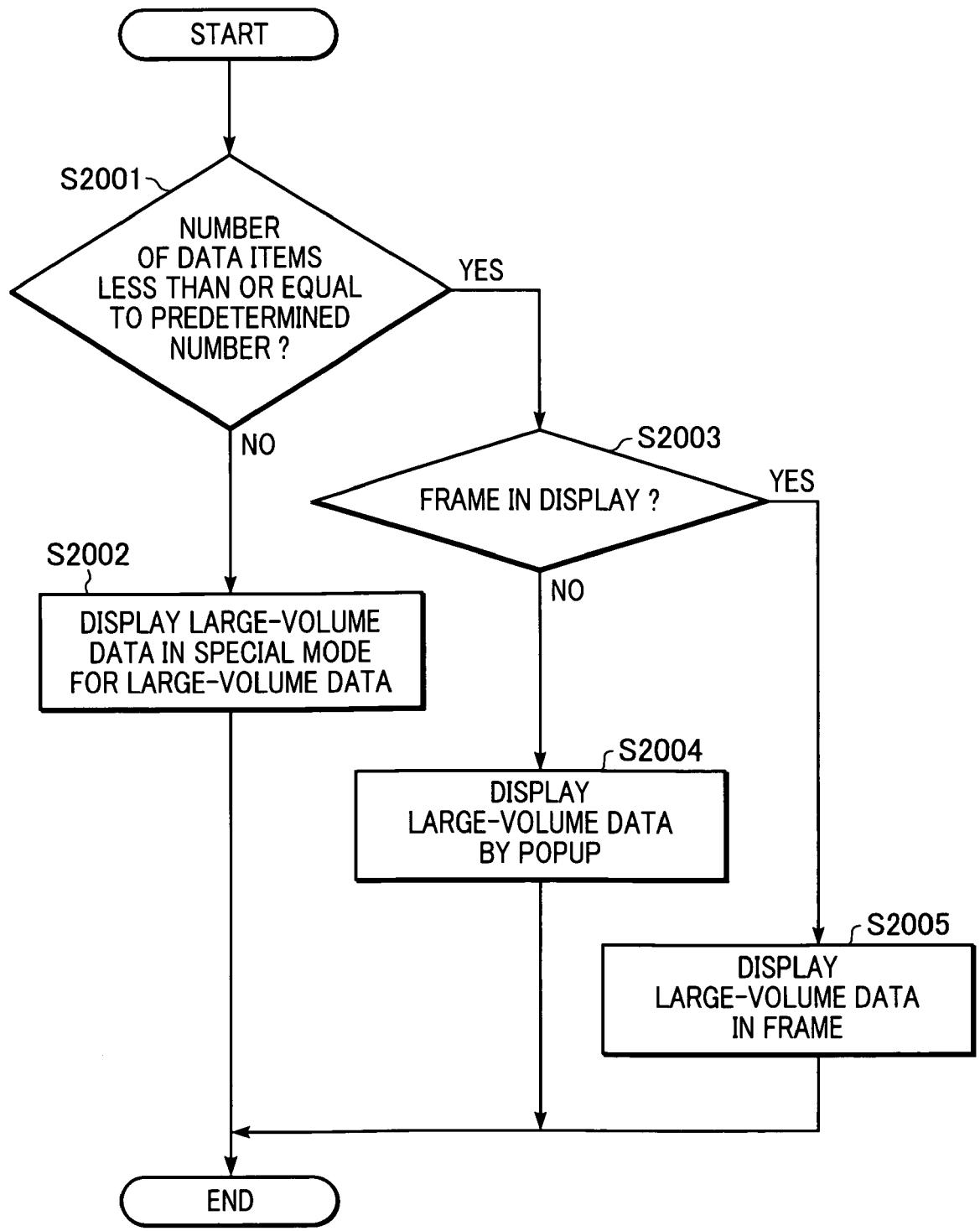
FIG. 13 is a flowchart showing a data-list displaying process in accordance with the second embodiment.
Figure 23:
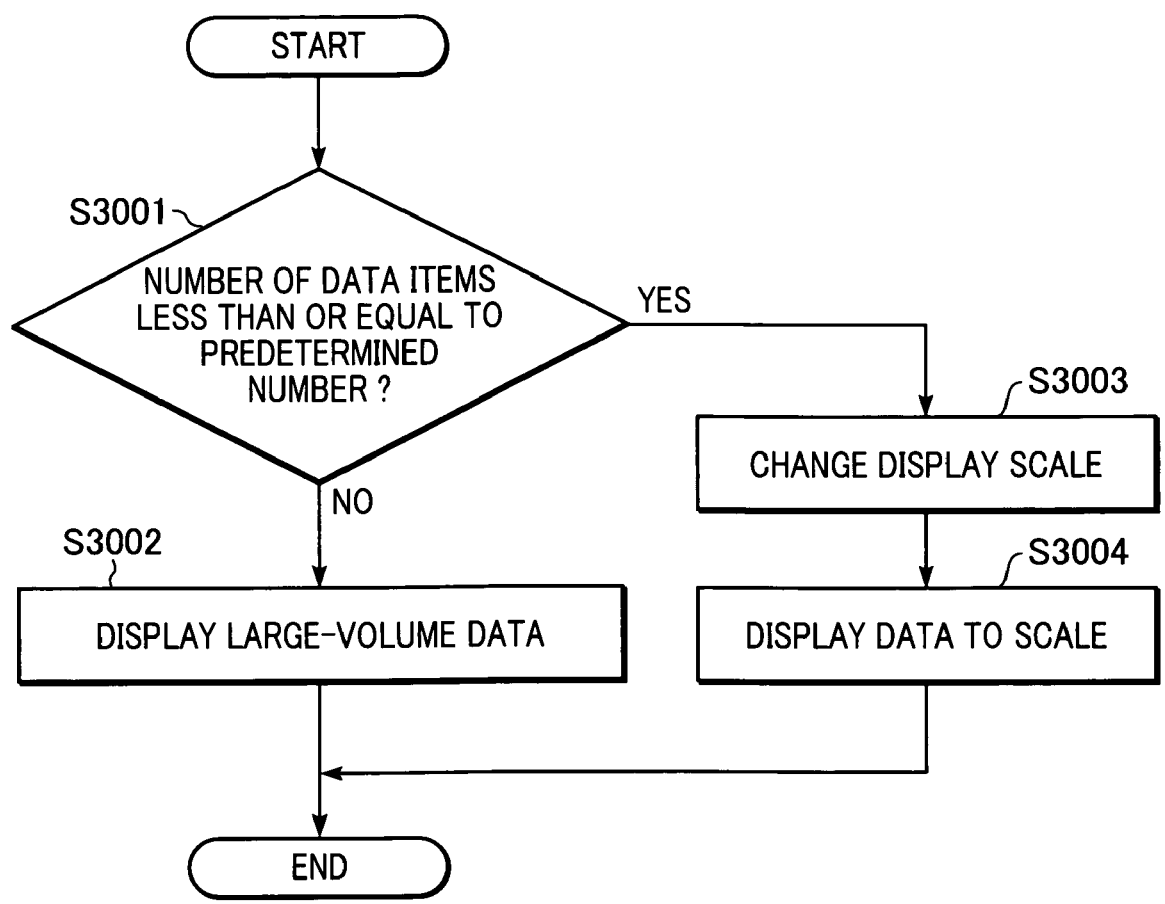
FIG. 23 is a flowchart showing a data-list displaying process in accordance with a fifth embodiment of the present invention.

Referring to FIG. 12, in step S1901, it is determined whether there are more than one data items specified. If it is determined in step S1901 that there is one data item specified, an application relevant to the specified data is started in step S1902. The procedure is then exited. However, if it is determined in step S1901 that more than one data item is specified, a list of specified data items is displayed in step S1903. An example of data list display processing is shown in FIG. 13 and described next. An alternative example of data list display processing is shown in FIG. 23 and is described later with reference to a fifth embodiment. After displaying the list of specified data items (step S1903), the procedure is exited.

FIG. 13 is a flowchart showing an example of the data-list displaying process (step S1903) shown in FIG. 12.

Figure 20:
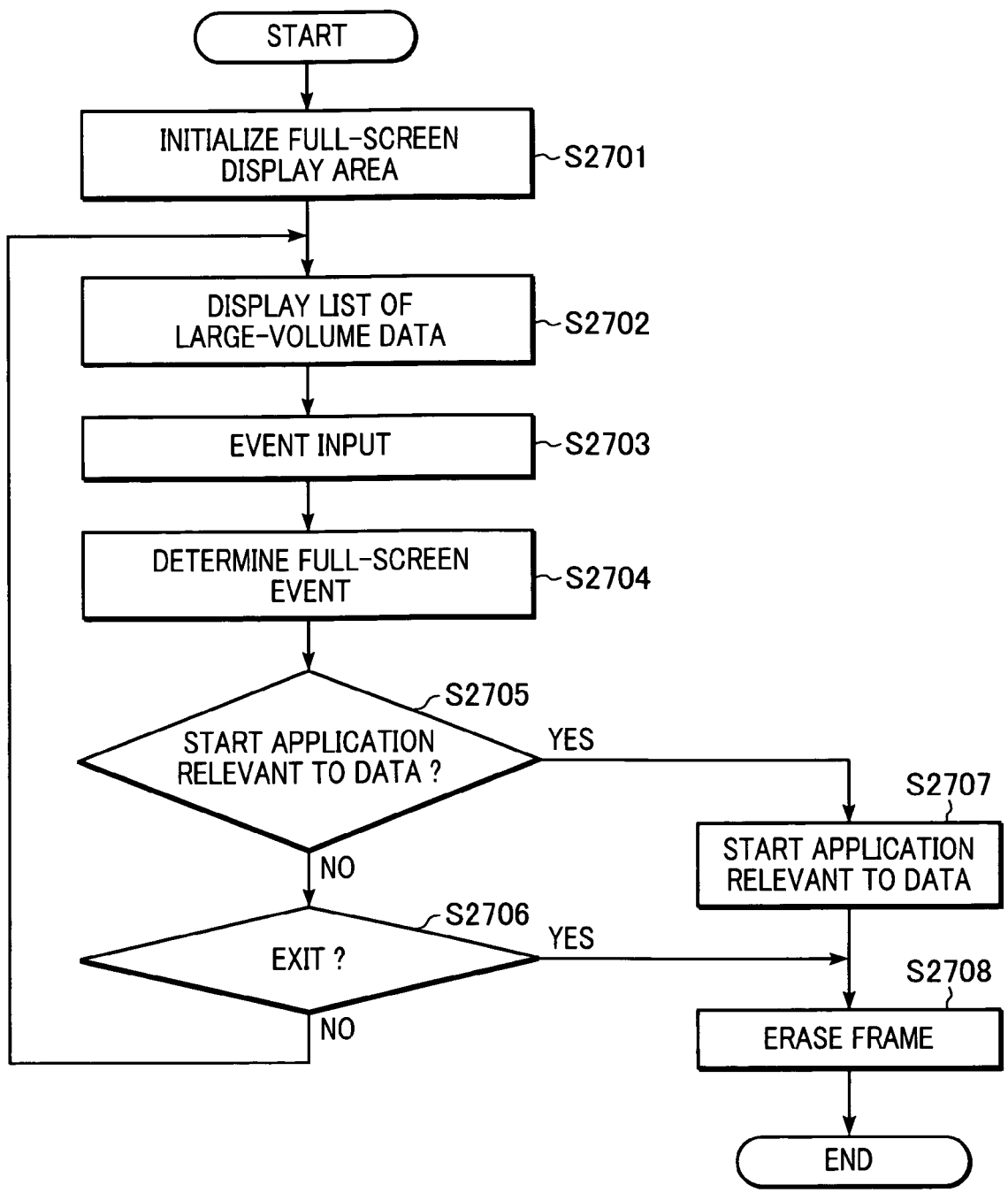
FIG. 20 is a flowchart showing a large-volume-data special-mode list displaying process in accordance with a fourth embodiment of the present invention.

Referring to FIG. 13, it is determined in step S2001 whether the number of data items to be displayed is less than or equal to a predetermined number. If it is determined in step S2001 that the number of data items is greater than the predetermined number, the set of data items to be displayed is displayed in a mode that is suitable for displaying large-volume data in step S2002. Exemplary processing for displaying a set of data items in a mode suitable for large-volume data is shown in FIG. 20 and described later with reference to a fourth embodiment. The procedure is then exited.

Figure 14:
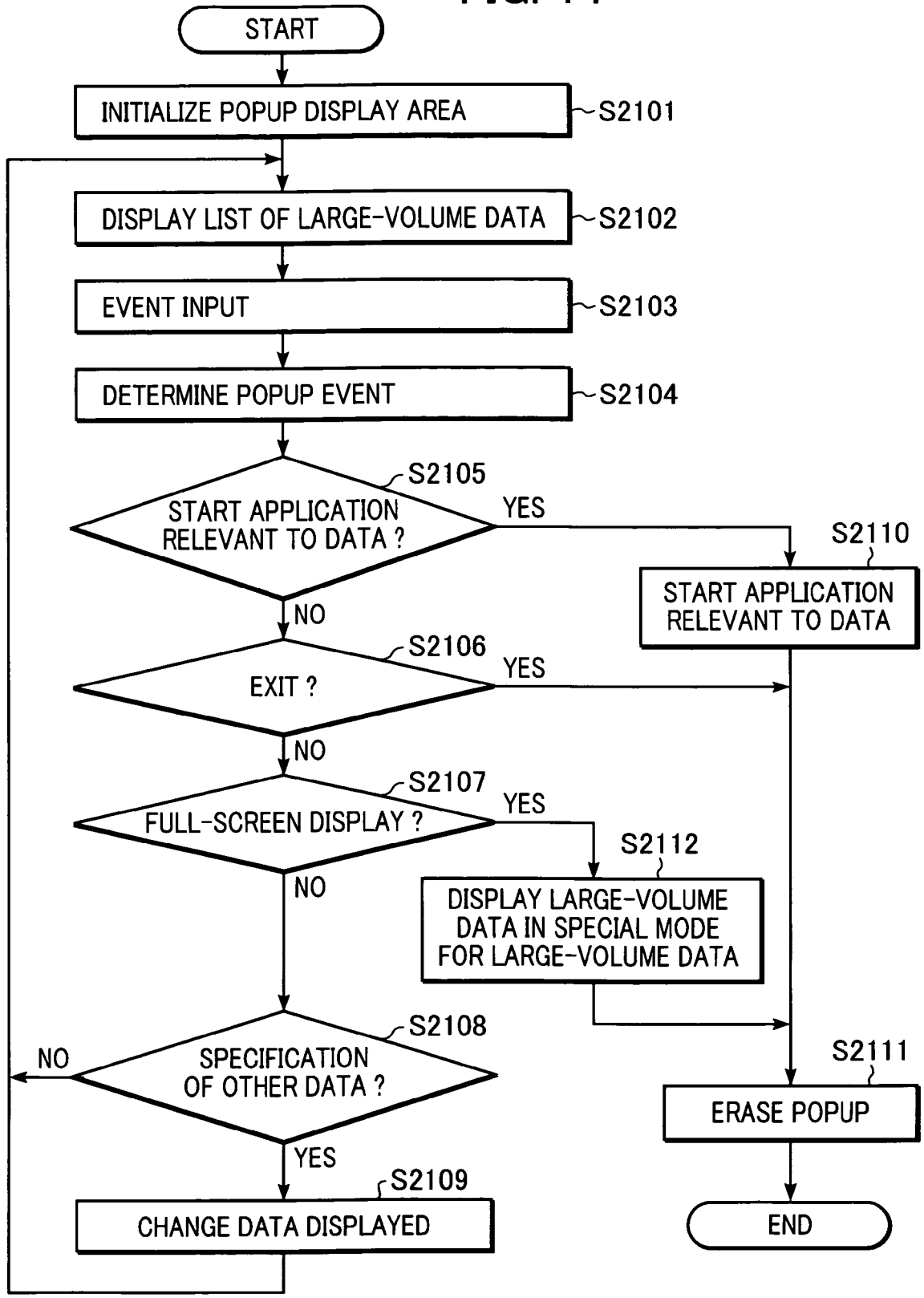
FIG. 14 is a flowchart showing a large-volume-data popup displaying process in accordance with the second embodiment.

On the other hand, if it is determined in step S2001 that the number of data items is within the predetermined number, it is determined whether a frame for displaying large-volume data is in display in step S2003. If it is determined in step S2003 that a frame is not in display, the set of data items to be displayed is displayed in a popup window in a screen currently in display in step S2004. An exemplary process for displaying a set of items to be displayed in a popup window in a screen is shown in FIG. 14 and described below. The procedure is then exited.

Figure 17:
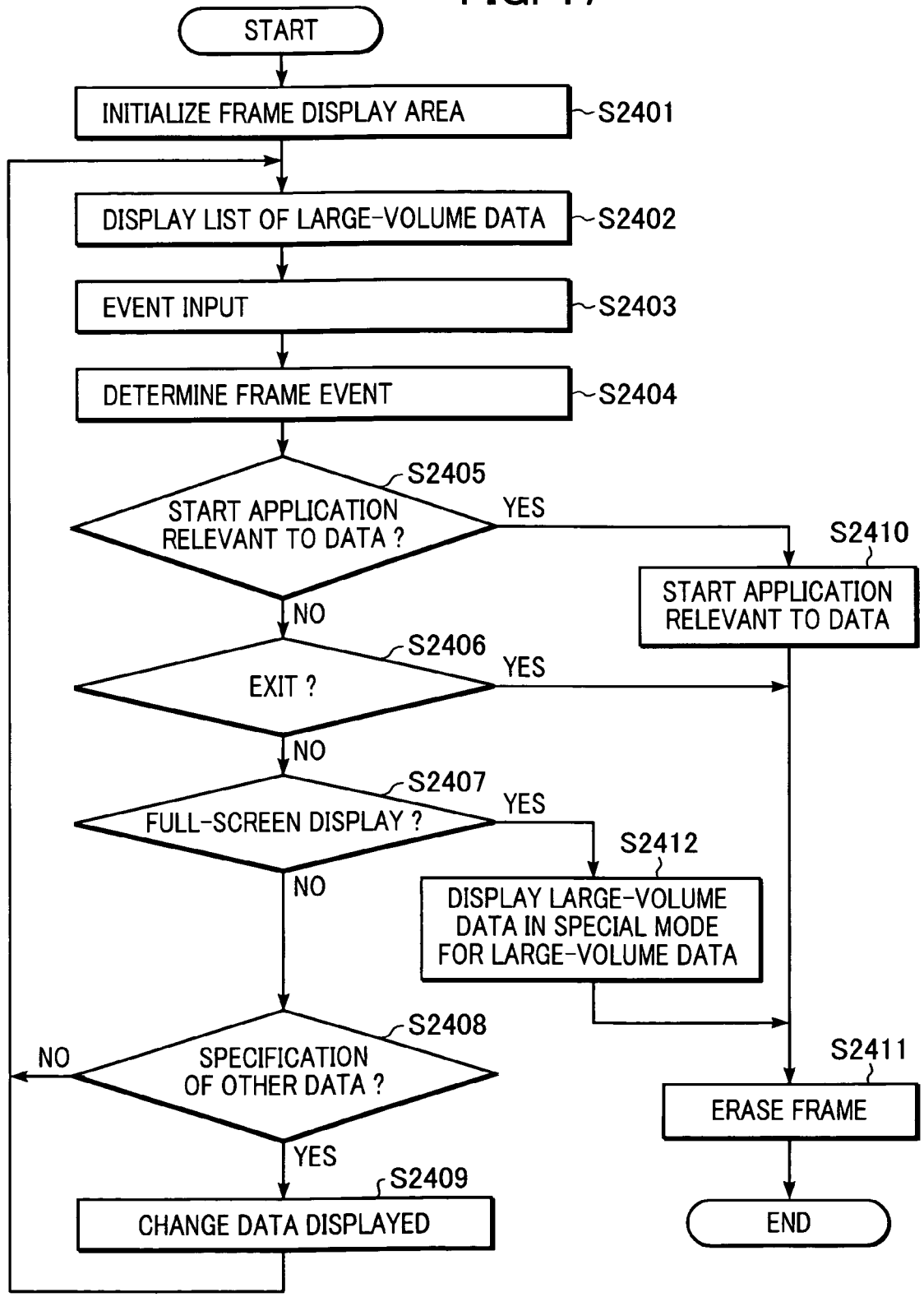
FIG. 17 is a flowchart showing a large-volume-data frame displaying process in accordance with a third embodiment of the present invention.

If it is determined in step S2003 that a frame is in display, the set of data items to be displayed is displayed in a display area in the frame on the screen in step S2005. An exemplary process for displaying the large-volume set of data items to be displayed in a display area in the frame on the screen is shown in FIG. 17 and described later with reference to a third embodiment. The procedure is then exited.

Large-Volume-Data Popup Displaying Process

FIG. 14 is a flowchart showing an example of the large-volume-data popup displaying process (step S2004) shown in FIG. 13.

Figure 15:
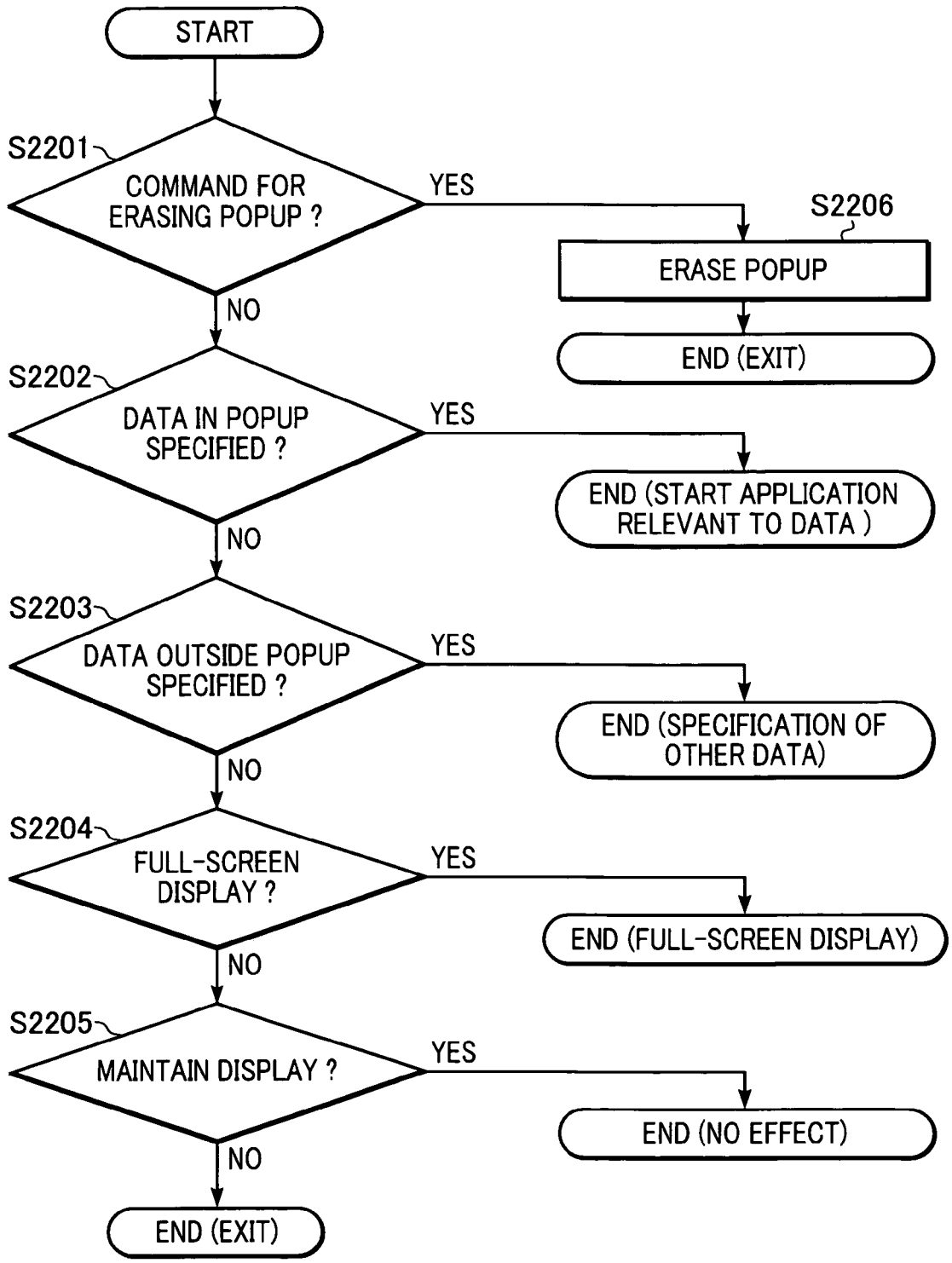
FIG. 15 is a flowchart showing a popup-event determining process in accordance with the second embodiment.

Referring to FIG. 14, in step S2101, a popup window displayed on the current screen is initialized. In step S2102, the set of data items to be displayed is displayed in the popup window. In step S2103, an event such as an operation performed by a user is input. In step S2104, the event is interpreted (i.e., determined). An exemplary process for determining the popup event (step S2104) is shown in FIG. 15 and described later.

In step 2105, it is determined whether "starting an application relevant to data" has been requested. If it is determined in step S2105 that "starting an application relevant to data" has been requested, processing relevant to the data is executed in the relevant-application starting process in step S2110. In step S2111, the popup window is erased. The procedure is then exited.

On the other hand, if it is determined in step S2105 that "starting a relevant application" has not been requested, in step S2106, it is determined whether exiting the procedure has been requested. If it is determined in step S2106 that exiting the procedure has been requested, the popup window is erased in step S2111, and the procedure is exited.

However, if it is determined in step S2106 that exiting the procedure has not been requested, in step S2107, it is determined whether "full-screen display" has been requested. If it is determined in step S2107 that "full-screen display" has been requested, the set of data items to be displayed is displayed in a mode suitable for large-volume data in step S2112. An exemplary process for displaying large-volume data in a special mode for large-volume data (step S2112) is shown in FIG. 20 and described later with reference to the fourth embodiment. The popup window is then erased in step S2111, and the procedure is exited.

If it is determined in step S2107 that "full-screen display" has not been requested, in step S2108, it is determined whether "specification of other data" for specifying data that is different from data currently in display has been requested. If it is determined in step S2108 that "specification of other data" has not been requested, the procedure returns to step S2102, and the procedure is repeated.

If it is determined in step S2108 that "specification of other data" has been requested, in step S2109, display data displayed in the popup window is changed. The procedure then returns to step S2102, and the procedure is repeated.

Popup-Event Determining Process

FIG. 15 is a flowchart showing an example of the popup-event determining process in step S2104 shown in FIG. 14.

Referring to FIG. 15, it is determined in step S2201 whether an event that has occurred relates to "request for erasing popup display." If it is determined in step S2201 that the event relates to "request for erasing popup display," the popup window is erased, and the procedure is exited with a processing result of "exit."

If it is determined in step S2201 that the event does not relate to "request for erasing popup display," in step S2202, it is determined whether the event relates to "specification of data in popup." If it is determined in step S2202 that the event relates to "specification of data in popup," the procedure is exited with a processing result of "start application relevant to data."

If it is determined in step S2202 that the event does not relate to "specification of data in popup," in step S2203, it is determined whether the event relates to "specification of data outside popup." If it is determined in step S2203 that the event relates to "specification of data outside popup," the procedure is exited with a processing result of "specification of other data" in order to newly display a specified data set in the popup.

If it is determined in step S2203 that the event does not relate to "specification of data outside popup," it is determined in step S2204 whether the event relates to "full-screen display." If it is determined in step S2204 that the event relates to "full-screen display," the procedure is exited with a processing result of "full-screen display" in order to display the data set over the full screen.

If it is determined in step S2204 that the event does not relate to "full-screen display," in step S2205, it is determined whether the event relates to "maintaining display." If it is determined that the event relates to "maintaining display," the procedure is exited with a processing result of "no effect." On the other hand, if it is determined that the event does not relate to "maintaining display, the procedure is exited with a processing result of "exit."

Screen Showing Time-Based Daily Schedule

Figure 16:
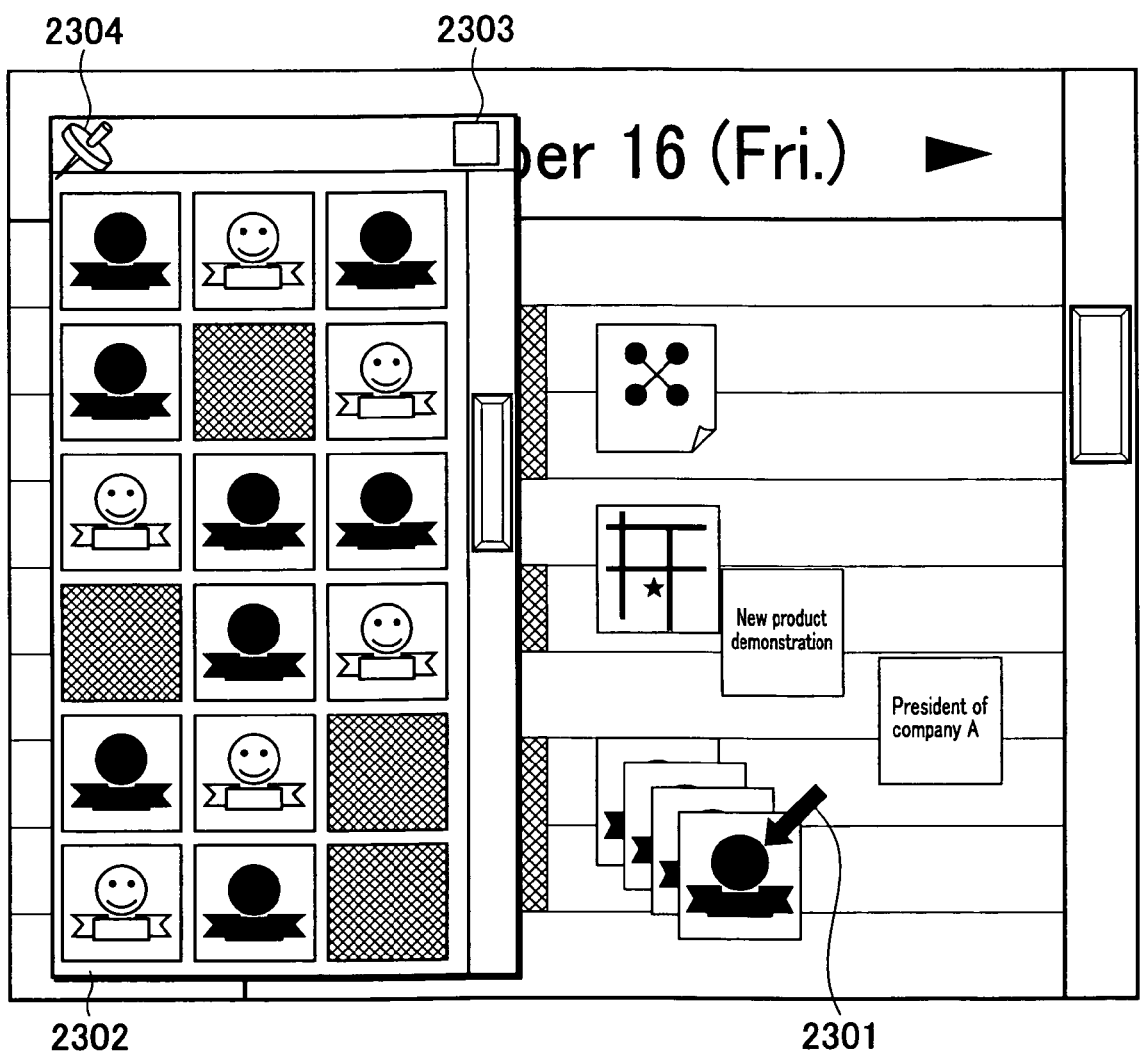
FIG. 16 is an illustration of a screen showing a time-based daily schedule in accordance with the second embodiment.

FIG. 16 is an illustration showing an example of a screen showing a time-based daily schedule in accordance with the second embodiment. The screen shows a schedule summary and data in relation to relevant periods. The screen also shows a popup window 2302.

The screen is an example screen that is displayed when large-volume data is displayed in an overlapped manner by a pointing device, such as a pen 2301, using the input unit 1. By the large-volume-data popup displaying process, the popup window 2302 is displayed, and a data set specified using the pen 2301 is displayed.

In an upper area of the popup window 2302, there is a popup display erasing button 2304 for erasing the popup window 2302, and a full-screen button 2303 for displaying a data set over the full screen.

As described above, according to the second embodiment, even when a large volume of data is displayed in a display area of a limited size in which the number of data items that can be displayed at once is restricted, rough searching for data and specific identification of data are facilitated. Furthermore, a normal display area does not become smaller.

Third Embodiment

FIG. 17 shows a flowchart of an example of a large-volume-data frame displaying process according to the third embodiment of the present invention. The process is executed in step S2005 shown in FIG. 13.

Figure 18:
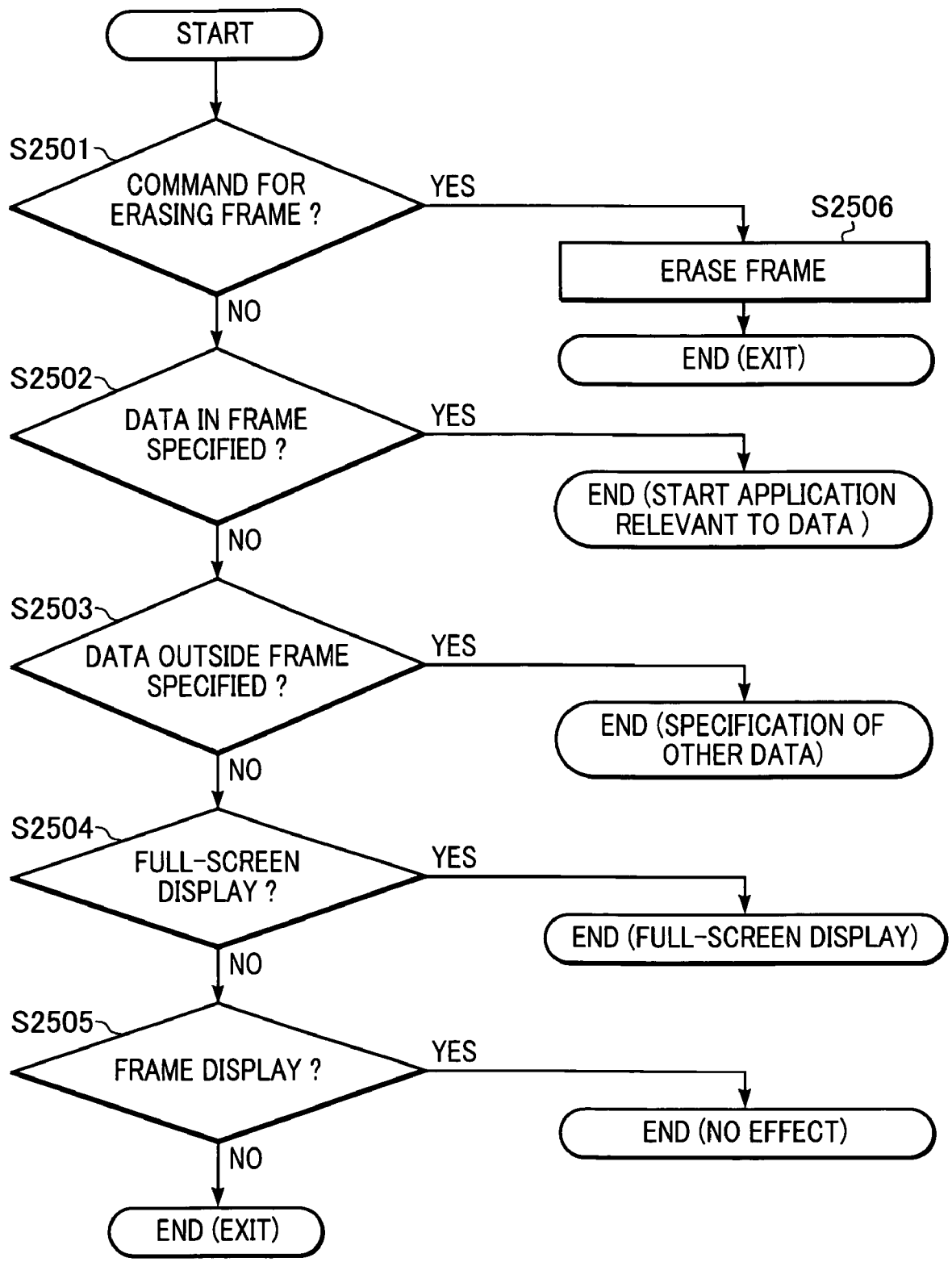
FIG. 18 is a flowchart showing a frame-event determining process in accordance with the third embodiment.

Referring to FIG. 17, in step S2401, a frame that is displayed in a current display screen is initialized. In step S2402, a set of data items to be displayed is displayed in the frame. In step S2403, an event such as an operation performed by a user is input. In step S2404, the event is interpreted (i.e., determined). FIG. 18 is a flowchart showing an example of the frame-event determining process (step S2404) and is described below.

In step S2405, it is determined if "starting relevant application" has been requested. If so, in step S2410, an application relevant to the data is started and processing is executed. The frame is erased in step 2411, and the procedure is then exited.

If it is determined in step S2405 that "starting relevant application" has not been requested, in step S2406, it is determined whether "exit" has been requested. If it is determined in step S2406 that "exit" has been requested, the frame is erased in step S2411, and the procedure is then exited.

If it is determined in step S2406 that "exit" has not been requested, in step S2407, it is determined whether "full-screen display" has been requested.

If it is determined in step S2407 that "full-screen display" has been requested, in step S2412, the data set to be displayed is displayed in a mode suitable for displaying large-volume data. FIG. 20 illustrates an exemplary process for displaying large-volume data in a special mode for large-volume data and is described later with reference to the fourth embodiment. After displaying the large-volume data in a special mode for large-volume data, the frame is erased in step S2411. The procedure is then exited.

If it is determined in step S2407 that "full-screen display" has not been requested, in step S2408, it is determined whether "specification of other data" for specifying data different from data that is currently displayed has been requested. If it is determined in step S2408 that "specification of other data" has not been requested, the procedure returns to step S2402, and the procedure is repeated.

If it is determined in step S2408 that "specification of other data" has been requested, data displayed in the frame is changed in step S2409. The procedure then returns to step S2402, and the procedure is repeated.

FIG. 18 is a flowchart showing an example of the frame-event determining process (step S2404) shown in FIG. 17.

Referring to FIG. 18, it is determined in step S2501 whether the event that has occurred relates to "request for erasing frame." If so, the frame is erased in step S2506, and the procedure is exited with a processing result of "exit."

If it is determined in step S2501 that the event does not relate to "request for erasing frame," in step S2502, it is determined whether the event relates to "specification of data in frame." If it is determined in step S2502 that the event relates to "specification of data in frame," the procedure is exited with a processing result of "start application relevant to data" in order to start an application relevant to the specified data.

If it is determined in step S2502 that the event does not relate to "specification of data in frame," in step S2503, it is determined whether the event relates to "specification of data outside frame." If it is determined in step S2503 that the event relates to "specification of data outside frame," the procedure is exited with a processing result of "specification of other data" in order to newly display the specified data set in the frame.

If it is determined in step S2503 that the event does not relate to "specification of data outside frame," in step S2504, it is determined whether the event relates to "full-screen display." If it is determined in step S2504 that the event relates to "full-screen display," the procedure is exited with a processing result of "full-screen display" in order to display the data items over the full screen.

If it is determined in step S2504 that the event does not relate to "full-screen display," in step S2505, it is determined whether the event relates to "frame display." If it is determined that the event relates to "frame display," the procedure is exited with a processing result of "no effect." If it is determined that the event does not relate to "frame display," the procedure is exited with a processing result of "exit."

Screen Showing Time-Based Daily Schedule

Figure 19:
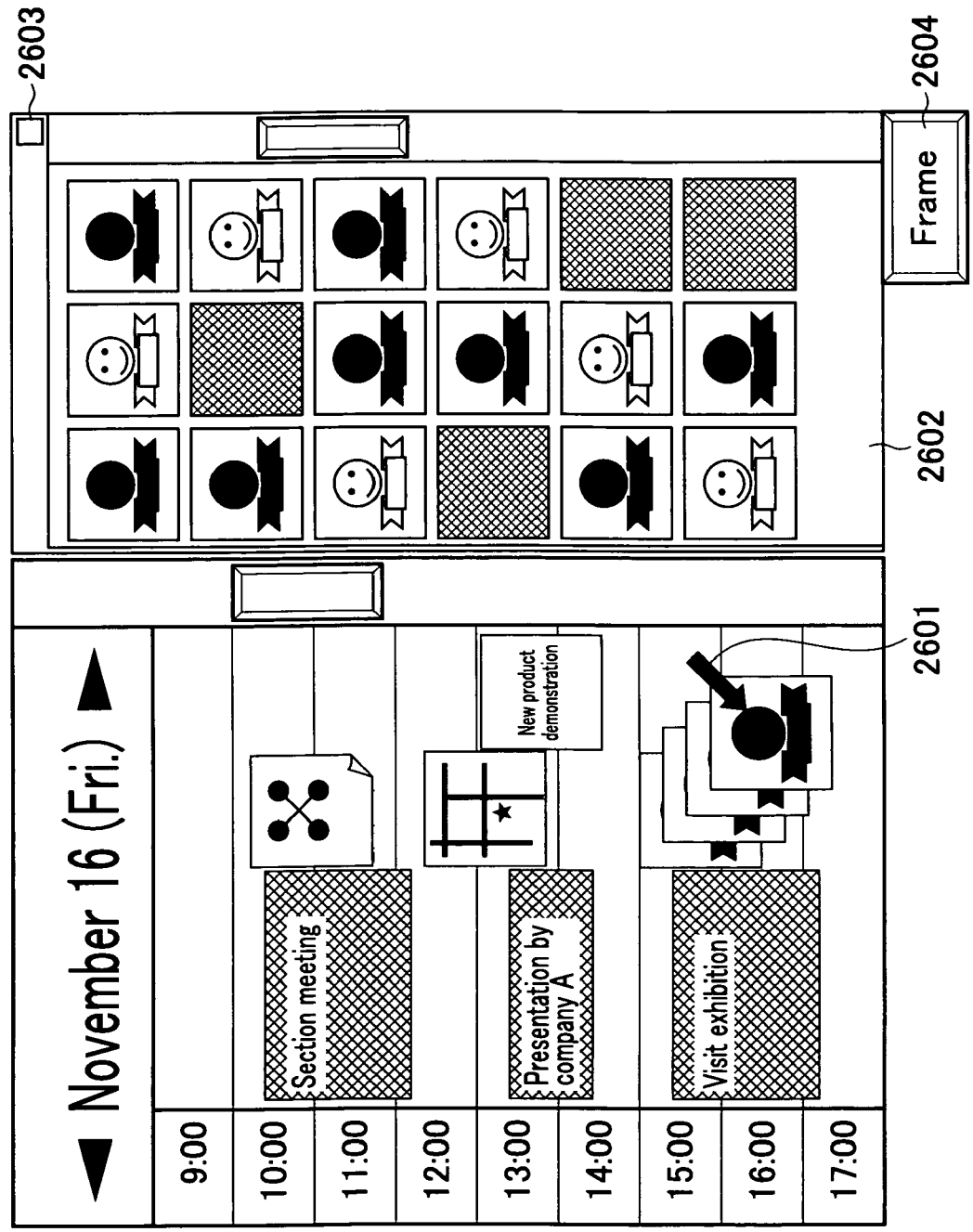
FIG. 19 is an illustration of a screen showing a time-based daily schedule in accordance with the third embodiment.

FIG. 19 is an illustration showing an example of a screen showing a time-based daily schedule according to the third embodiment. The screen shows a schedule summary and data in relation to periods. The screen also shows a separate frame 2602.

The screen is an example screen that is displayed when large-volume data is displayed in an overlapped manner pointed by a pointing device, such as a pen 2601. By the large-volume-data frame displaying process described earlier, the frame 2602 of a popup window is displayed, and a data set pointed by the pen 2601 is displayed in the frame 2602.

Furthermore, in an upper area of the frame 2602, a full-screen display button 2603 for displaying a data set over the full screen is provided. Furthermore, a frame display button 2604 for erasing the frame itself is provided.

As described above, according to the third embodiment, even when a large volume of data is displayed in a limited display area in which the number of data items that can be displayed at once is restricted, rough searching for data and specific identification of data are facilitated. Furthermore, a normal display area does not become hidden.

Fourth Embodiment

Large-Volume-Data Special-Mode Displaying Process

FIG. 20 is a flowchart showing an example of the large-volume-data special-mode displaying process according to the fourth embodiment of the present invention. This process is executed in step S2002 shown in FIG. 13, in step S2112 shown in FIG. 14, and in step S2412 shown in FIG. 17.

Figure 21:
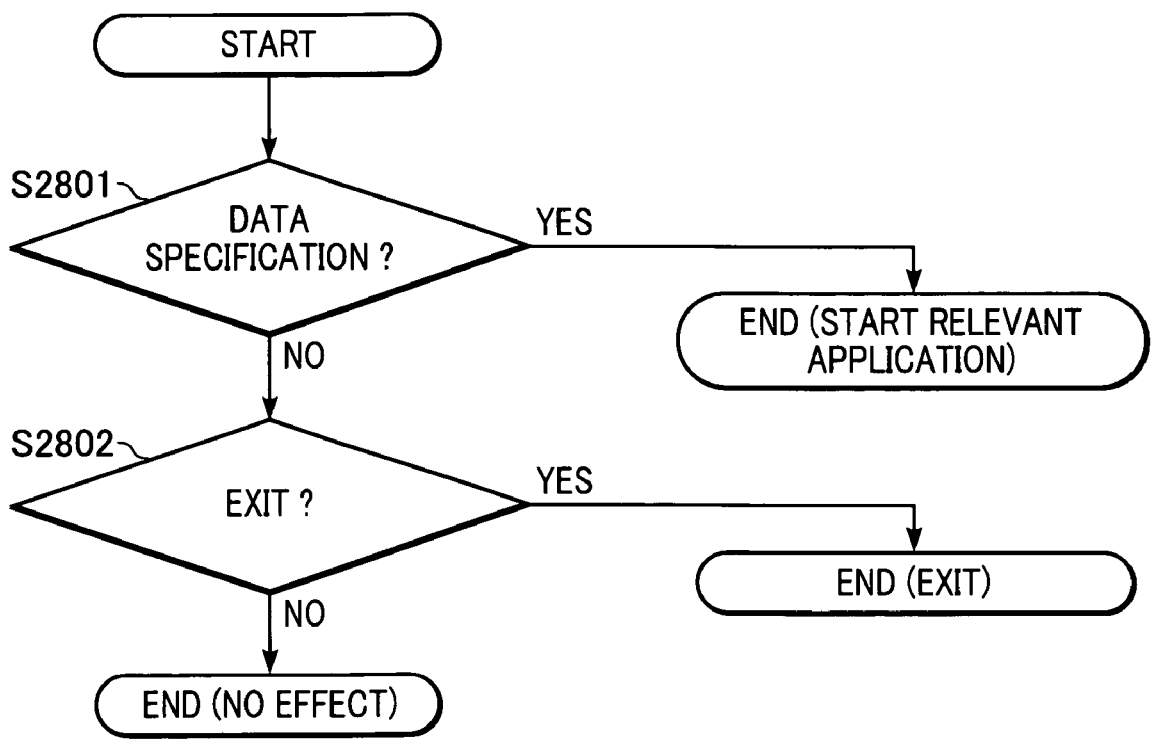
FIG. 21 is a flowchart showing a full-screen-event determining process in accordance with the fourth embodiment.
Figure 22:
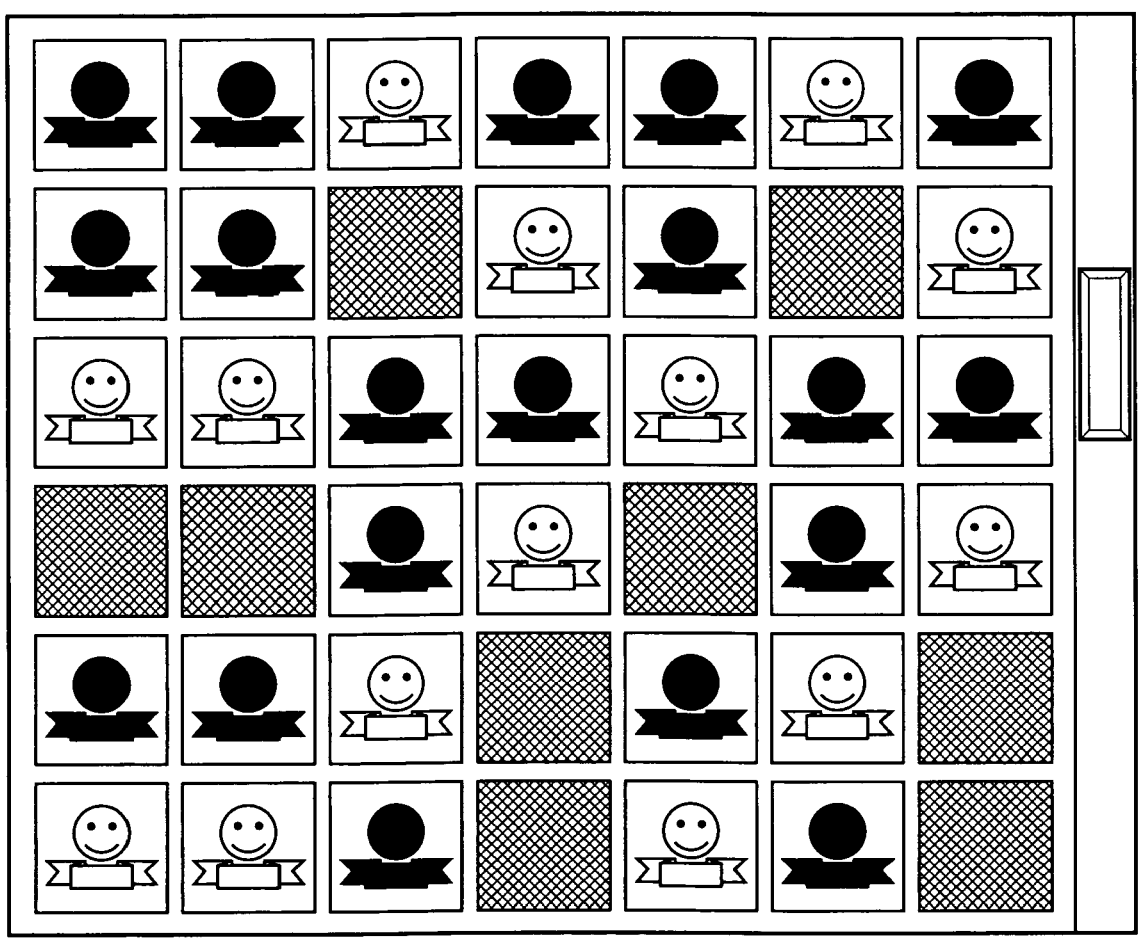
FIG. 22 is an illustration of a screen dedicated to a list of large-volume data in accordance with the fourth embodiment.

Referring to FIG. 20, the full-screen display area is initialized in step S2701. In step S2702, the data set to be displayed is displayed (refer to a large-volume-data special-mode list display screen in FIG. 22). In step S2703, an event such as an operation performed by a user is input. In step S2704, the event is interpreted, i.e., determined. An exemplary flowchart for determining a full-screen event is shown in FIG. 21 and described below.

If it is determined in step S2705 that the event relates to "starting relevant application," in step S2707, an application relevant to the data is started and processing is executed. In step S2708, the frame is erased. The procedure is then exited.

If it is determined in step S2705 that the event does not relate to "starting relevant application," in step S2706, it is determined whether "exit" has been requested. If it is determined in step S2706 that "exit" has been requested, the frame is erased in step S2708, and the procedure is then exited.

If it is determined in step S2706 that "exit" has not been requested, the procedure returns to step S2702, and the procedure is repeated.

FIG. 21 is a flowchart showing an example of the full-screen event determining process in step S2704 shown in FIG. 20.

Referring to FIG. 21, in step S2801, it is determined whether the event that has occurred relates to "specification of data." If it is determined in step S2801 that the event relates to "specification of data," the procedure is exited with a processing result of "start relevant application" in order to start an application relevant to the specified data.

If it is determined in step S2801 that the event does not relate to "specification of data," in step S2802, it is determined whether the event relates to "exit." If it is determined that the event does not relate to "exit," the procedure is exited with a processing result of "no effect." If it is determined that the event relates to "exit," the procedure is exited with a processing result of "exit."

As described above, according to the fourth embodiment, even when a large volume of data is displayed in a limited display area in which the number of data items that can be displayed at once is restricted, rough searching for data and specific identification of data are facilitated. Furthermore, data is displayed over the full screen when strictly identifying data. This further facilitates identification of data.

Fifth Embodiment

Data List Displaying Process

FIG. 23 is a flowchart showing, as the fifth embodiment of the present invention, another example of the data list displaying process shown in FIG. 13, described in relation to the second embodiment.

Referring to FIG. 23, it is determined in step S3001 whether the number of data items to be displayed is less than or equal to a predetermined number. If it is determined in step S3001 that the number of data items is not less than or equal to the predetermined number of items, the data items to be displayed are displayed on a screen that is suitable for displaying and manipulating large-volume data in step S3002. The procedure is then exited.

Figure 24:
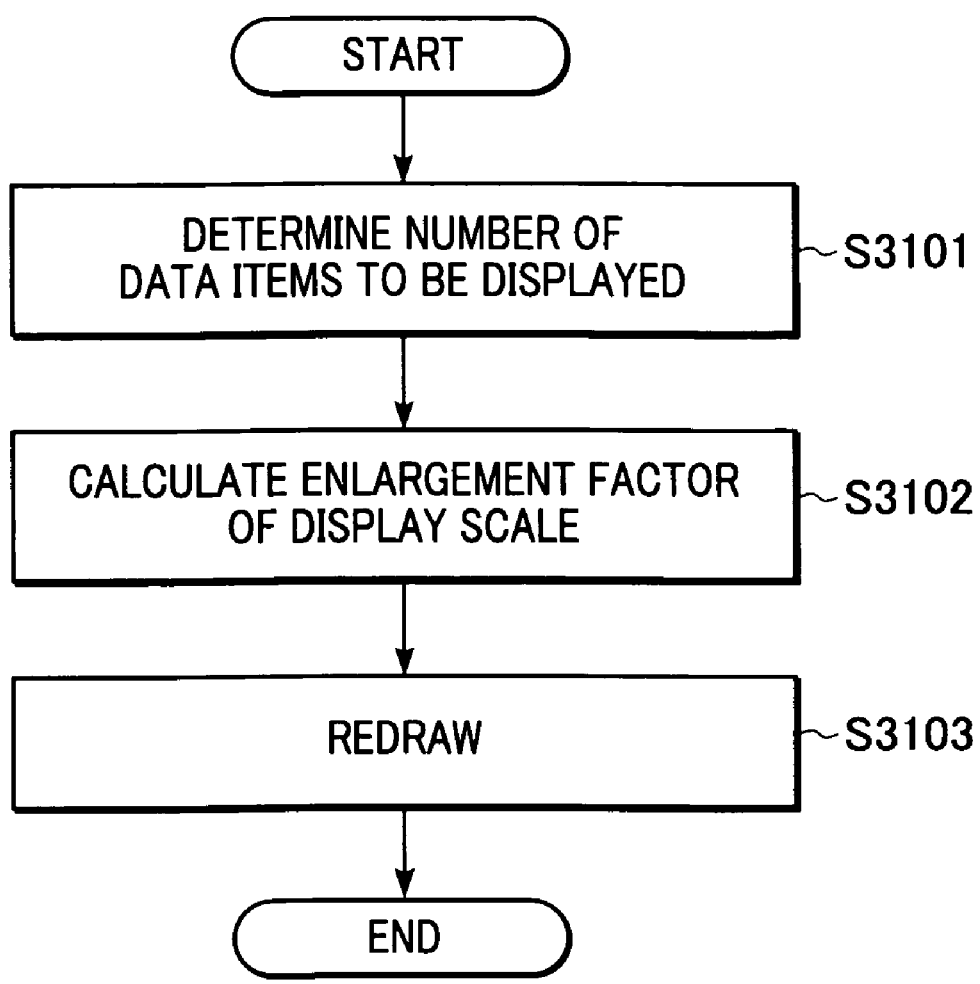
FIG. 24 is a flowchart showing a display-scale changing process in accordance with the fifth embodiment.
Figure 25:
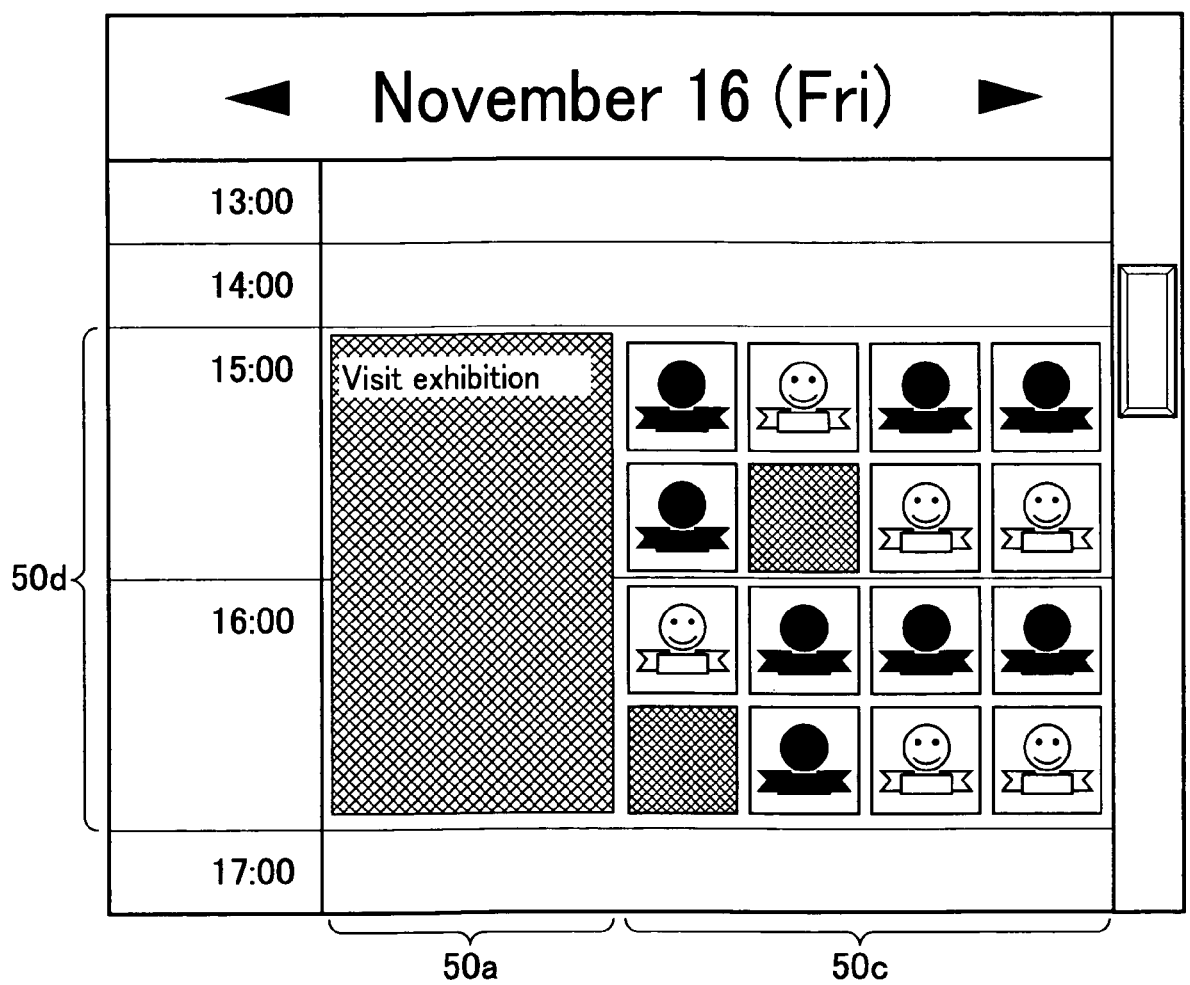
FIG. 25 is an illustration of a screen showing a time-based daily schedule in accordance with the fifth embodiment.

If it is determined in step S3001 that the number of data items is less than or equal to the predetermined number, the display scale is changed, in step S3003, so that the data items to be displayed can be displayed. FIG. 24 illustrates an exemplary process for changing the display scale (step S3003) and is described below. In step S3004, the data items are displayed to the scale that has been changed, as shown in FIG. 25. The procedure is then exited.

Display Scale Changing Process

FIG. 24 is a flowchart showing an example of the display-scale changing process (step S3003) shown in FIG. 23.

Referring to FIG. 24, in step S3101, the number of data items to be displayed on the screen is determined. In step S3102, an enlargement factor of display scale is calculated from the number of data items that can be displayed by the current scale and the number of data items to be displayed. In step S3103, a calendar frame, schedule data, and the like are redrawn by the enlarged scaled. The procedure is then exited.

Screen Showing Time-Based Daily Schedule

FIG. 25 is an illustration showing an example of a screen showing a time-based daily schedule in accordance with the fifth embodiment. The screen shows a schedule summary 50*a* and data 50*c* in relation to periods.

In the display screen, only a scale 50*d* of a period corresponding to a display area of specified data items is enlarged enough to display all the data items to be displayed. Other scales are maintained at a standard scale.

As described above, according to the fifth embodiment, even when a large volume of data is displayed in a limited display area in which the number of data items that can be displayed at once is restricted, rough searching for data and specific identification of data are facilitated. Furthermore, a normal display area does not become smaller, or a normal display screen does not become hidden. This further facilitates specific identification of data.

Sixth Embodiment

Large-Volume-Data Representative Displaying Process

FIG. 26 is a flowchart showing an example of a large-volume-data representative displaying process as a sixth embodiment of the present invention. This process is executed in step S1305 shown in FIG. 6.

Referring to FIG. 26, in step S3301, representative data of a set of data items to be displayed is determined. In step S3302, the representative data is displayed such that the representative data will be recognized as representative data. The procedure is then exited.

Figure 27:
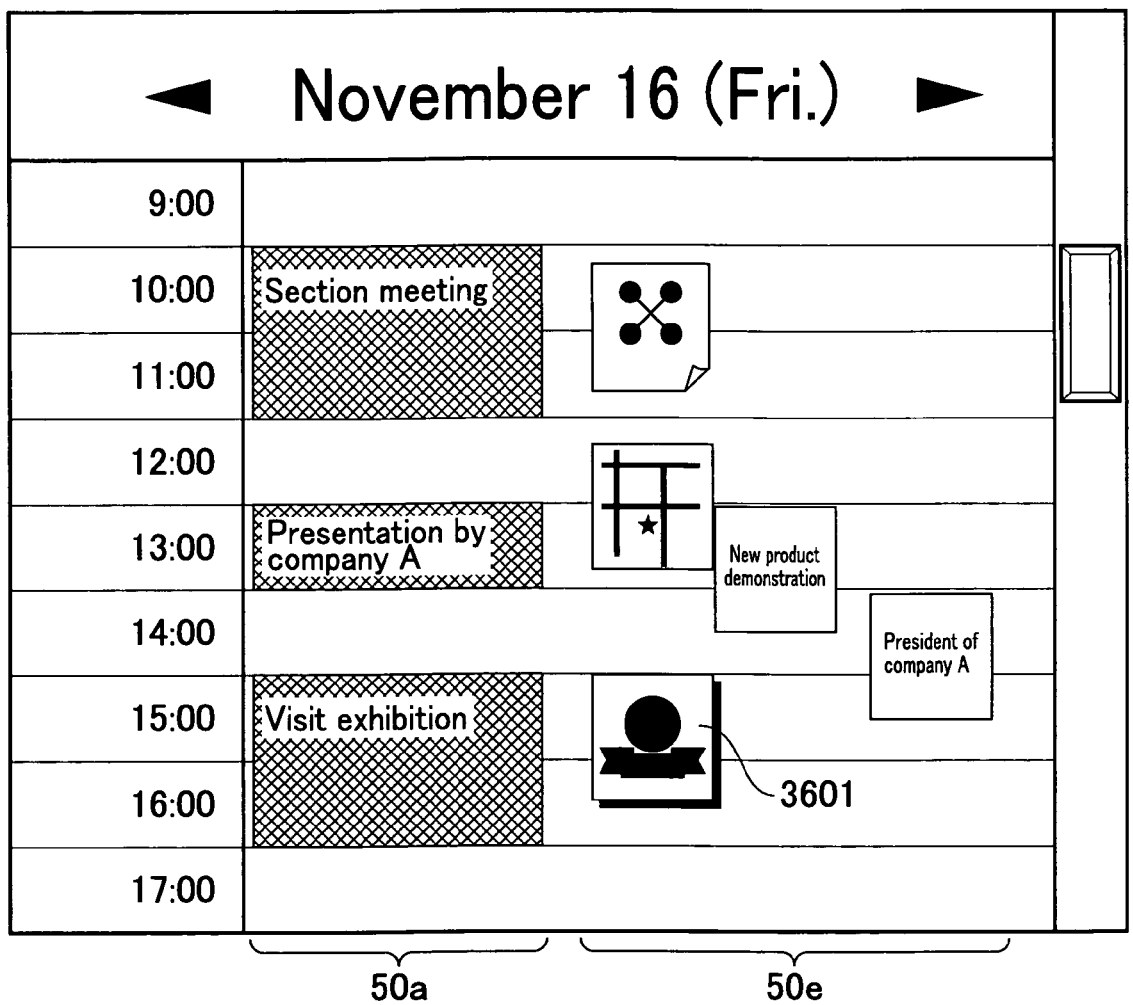
FIG. 27 is an illustration of a screen showing a time-based daily schedule in accordance with the sixth embodiment.

FIG. 27 is an illustration of an example of a screen showing a time-based daily schedule in accordance with the sixth embodiment. The screen shows a schedule summary 50*a* and data 50*e* in relation to periods. The screen shows representative data 3601 in shade so that the representative data 3601 can be distinguished from other data. A variety of display techniques can be used to display the representative data in a distinguishing manner. For example, as shown in FIG. 27, the representative data may be shaded. Other techniques for distinguishing the representative data may be used. For example, the representative data could be displayed in a distinguishing color, such as red, or in an animated fashion, such as flashing.

Representative-Data Determining Process

Figure 28:
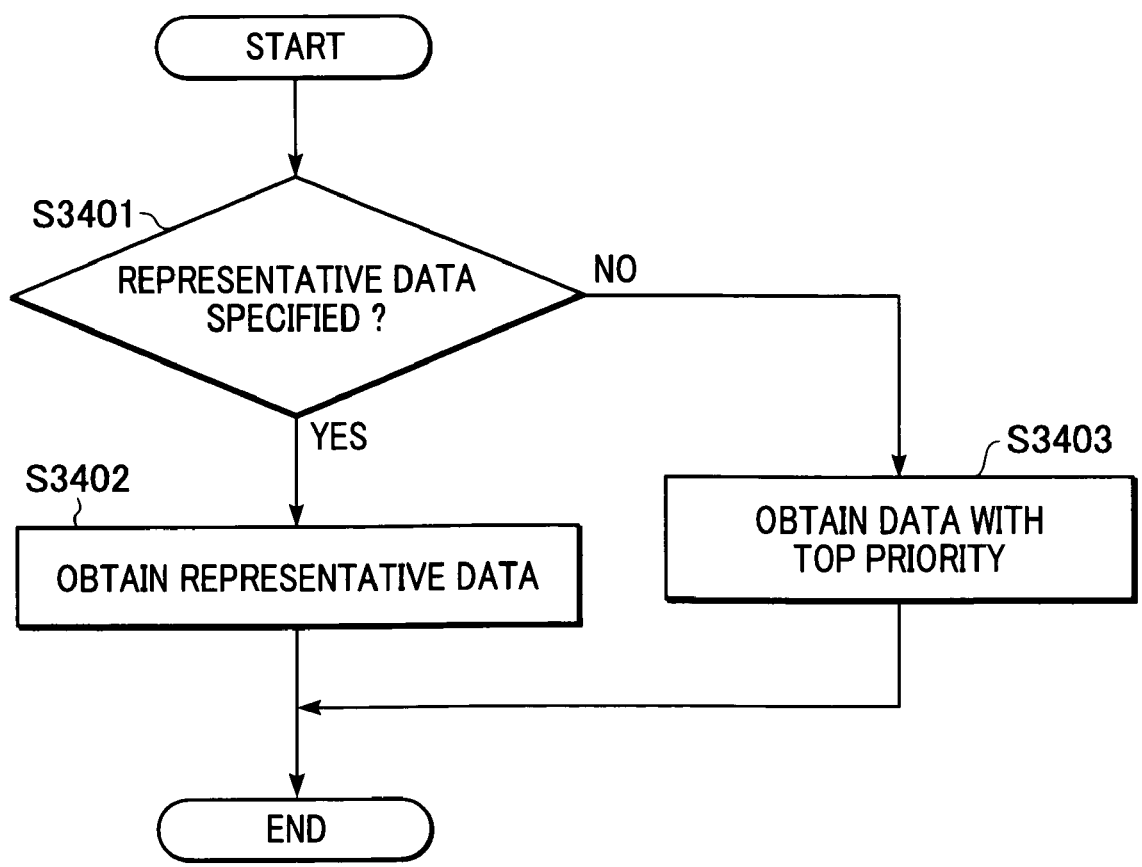
FIG. 28 is a flowchart showing a representative-data determining process in accordance with the sixth embodiment.

FIG. 28 is a flowchart showing an example of the representative-data determining process executed in step S3301 shown in FIG. 26.

Referring to FIG. 28, it is determined in step S3401 whether representative data has been specified. If it is determined in step S3401 that representative data has been specified, representative data is obtained and determined in step S3402. The procedure is then exited.

If it is determined in step S3401 that representative data has not been specified, a data item having a top priority is obtained and determined in step S3403. The procedure is then exited.

Representative-Data Specifying Process

FIG. 29 is a flowchart showing an example of a representative-data specifying process in accordance with the sixth embodiment. This is a form of individual processing (step S905) that is invoked by other events in the overall procedure of processing shown in FIG. 2.

Referring to FIG. 29, in step S3501, an event corresponding to an operation of specifying representative data is received. In step S3502, it is determined whether the event relates to "specification of representative data." If it is determined in step S3501 that the event relates to "specification of representative data," specification of representative data is changed as specified in step S3503. The procedure then returns to step S3501, and the procedure is repeated.

If it is determined in step S3502 that the event does not relate to "specification of representative data," it is determined in step S3504 whether the event relates to "changing order." If it is determined in step S3504 that the event relates to "changing order," the order is changed based on a specified criterion in step S3505. The procedure then returns to step S3501, and the procedure is repeated.

If it is determined in step S3504 that the event does not relate to "changing order," it is determined in step S3506 whether the event relates to "exit." If it is determined that the event does not relate to "exit," the procedure returns to step S3501, and the procedure is repeated. If it is determined in step S3506 that the event relates to "exit," the procedure is exited.

Representative-Data Specifying Operation Screen

Figure 30:
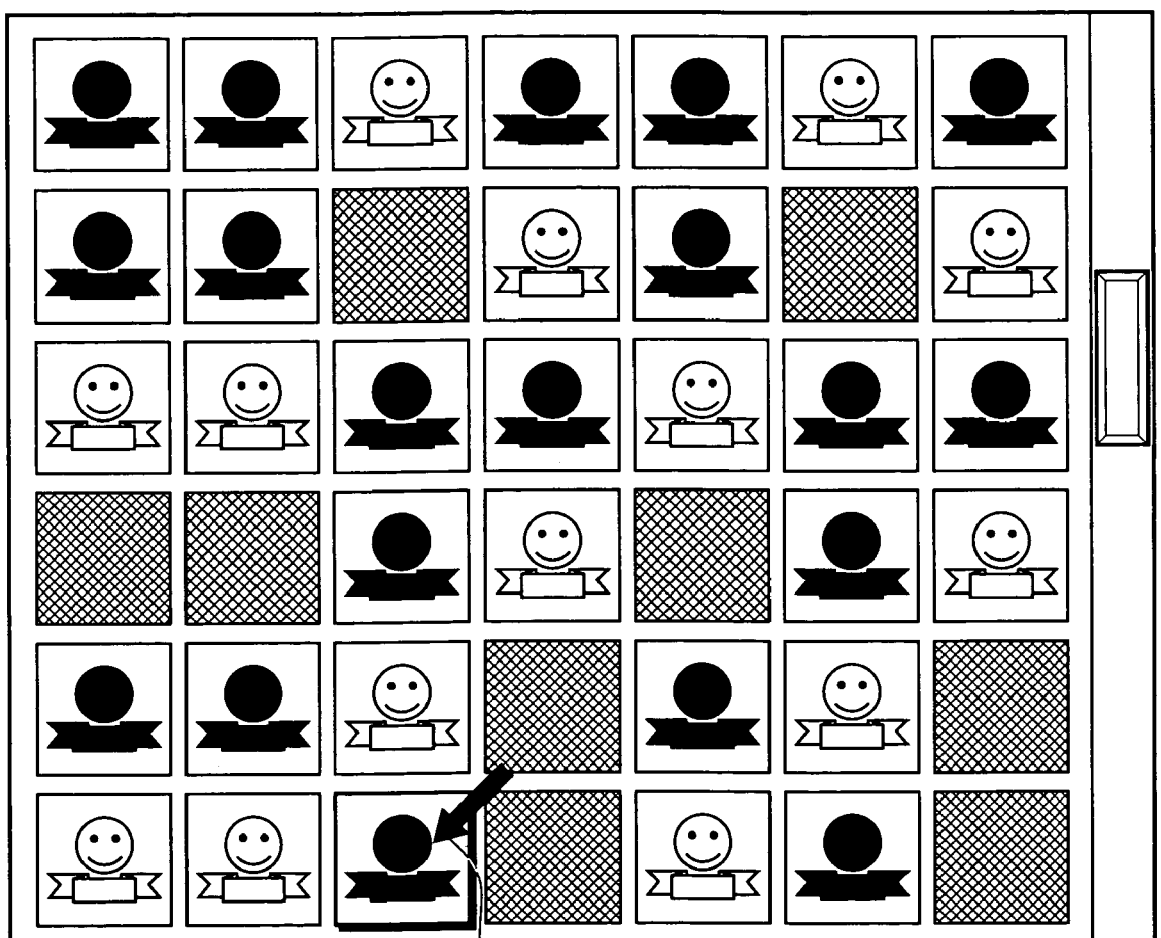
FIG. 30 is an illustration of a screen for allowing an operation for changing specification of representative data in accordance with the sixth embodiment.

FIG. 30 is an illustration showing an example of a screen for allowing a representative-data specifying operation in accordance with the sixth embodiment. When representative data is specified on the screen using a pointing device, such as a pen 3701, it is determined in step S3502 of FIG. 29 that representative data has been specified.

Figure 31:
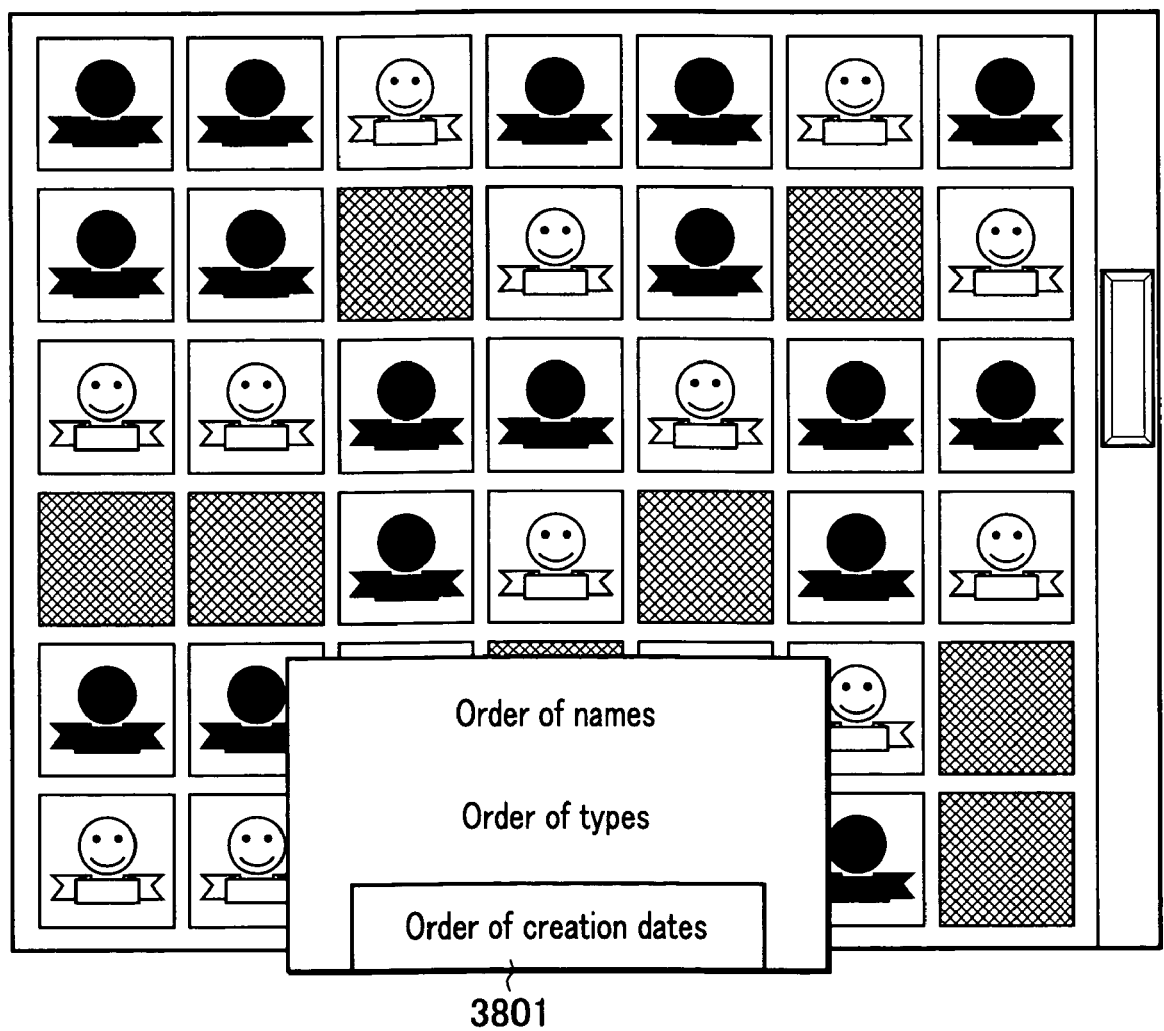
FIG. 31 is an illustration of a screen for allowing an operation for changing an order of representative data in accordance with the sixth embodiment.

FIG. 31 is an illustration of an example of a screen for allowing an operation of changing order of representative data in accordance with the sixth embodiment. When a display order has been specified from an order specifying menu 3801 on the order changing screen, it is determined in step S3504 of FIG. 29 that the order has been changed.

As described above, according to the sixth embodiment, even when a large volume of data is displayed in a limited display area in which the number of data items that can be displayed at once is restricted, rough searching for data is facilitated. Furthermore, a meaningful unit of large-volume data can be recognized.

Seventh Embodiment

FIG. 32 is a flowchart showing an example of a large-volume-data reduced displaying process in accordance with the seventh embodiment of the present invention. This process is executed in the large-volume-data reduced displaying process (step S1303) shown in FIG. 6.

Referring to FIG. 32, in step S3901, the number of data items to be displayed is determined. In step S3902, a reduction factor of display size is calculated from the number of data items that can be displayed in a current size and the number of data items to be displayed. In step S3903, data is displayed in the reduced size, as shown in FIG. 33, and the procedure is then exited.

Figure 33:
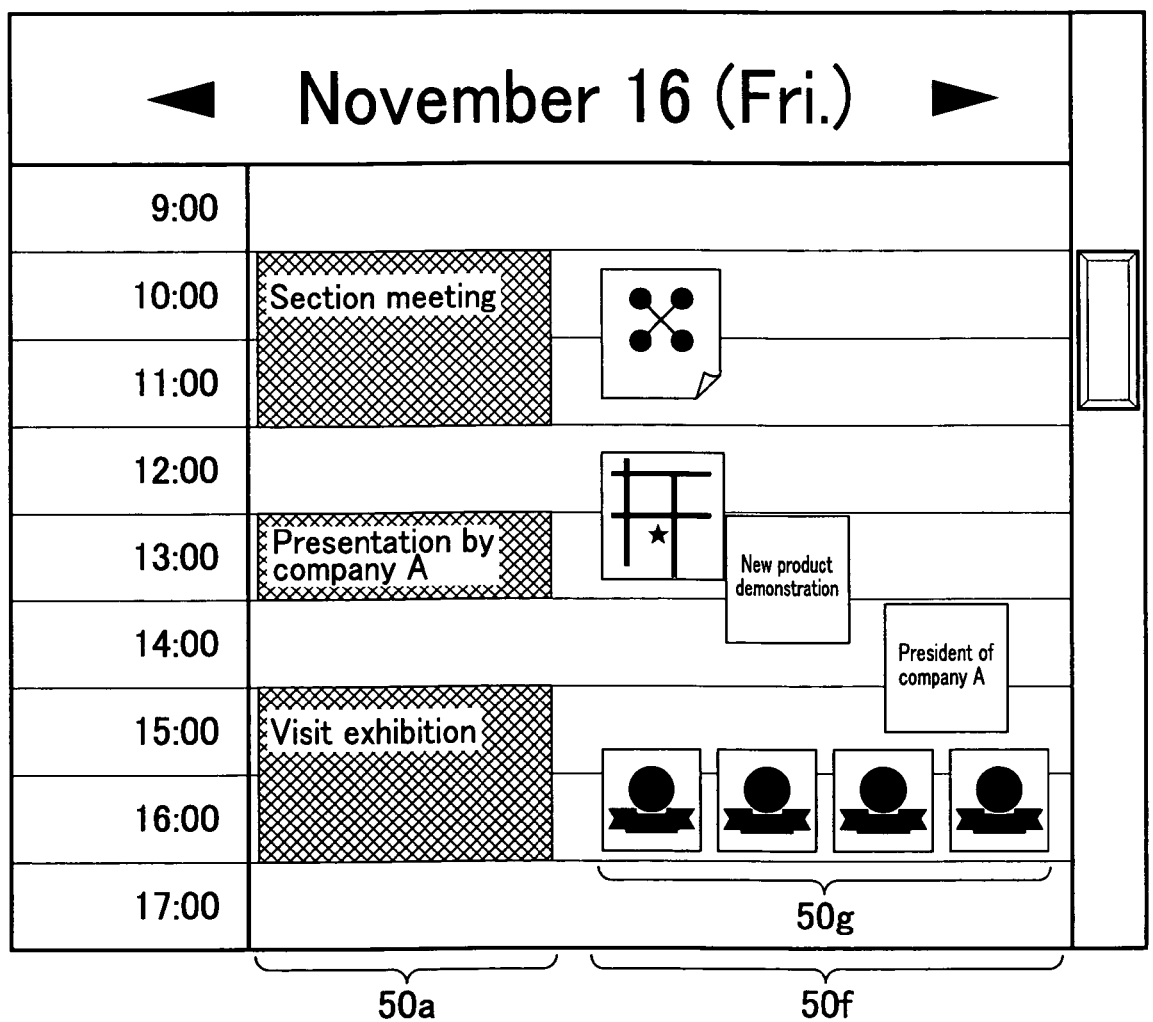
FIG. 33 is an illustration of a screen showing a time-based daily schedule in accordance with the seventh embodiment.
Figure 34:
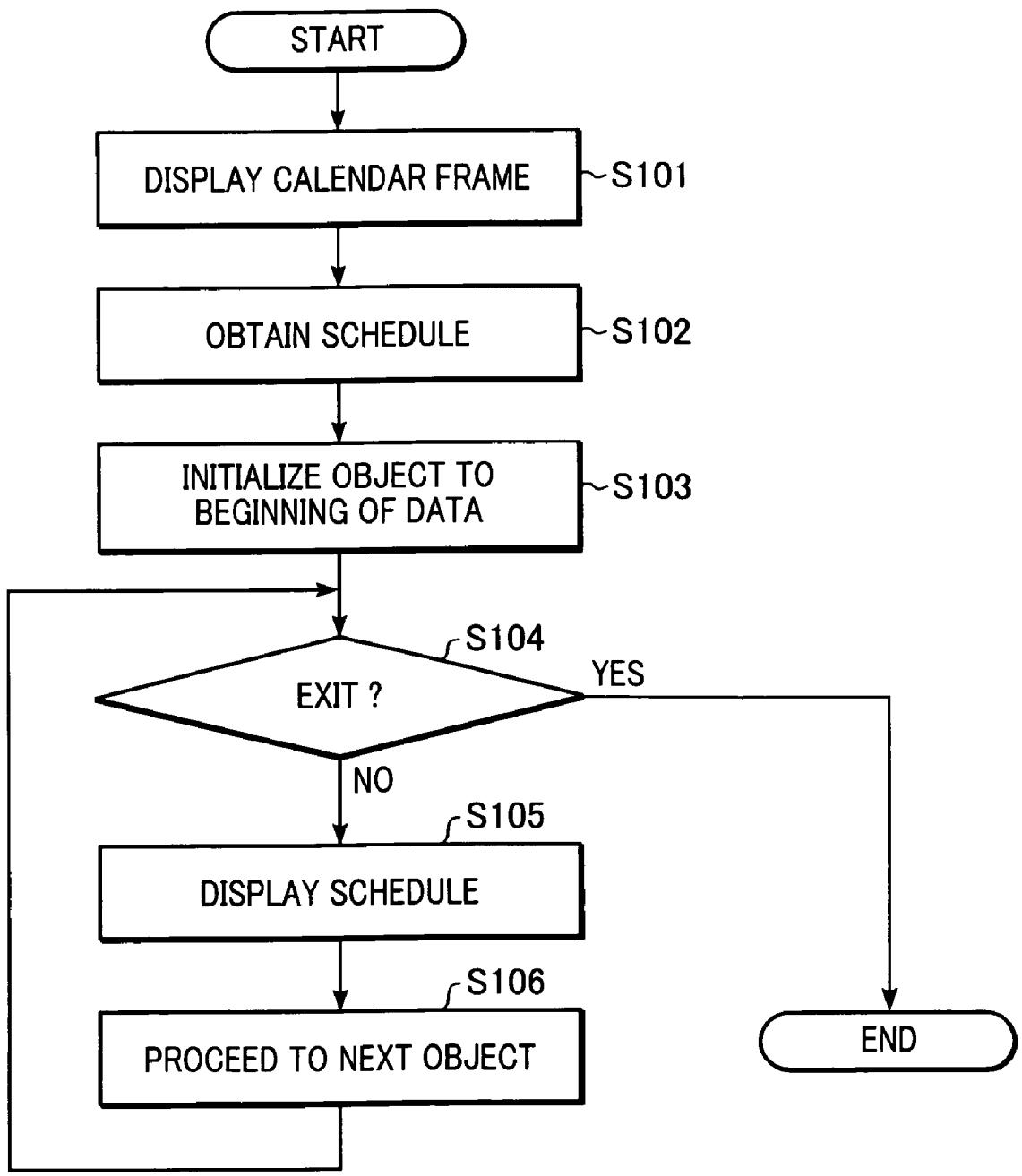
FIG. 34 is a flowchart showing a scheduler-format displaying process according to a related art.
Figure 38:
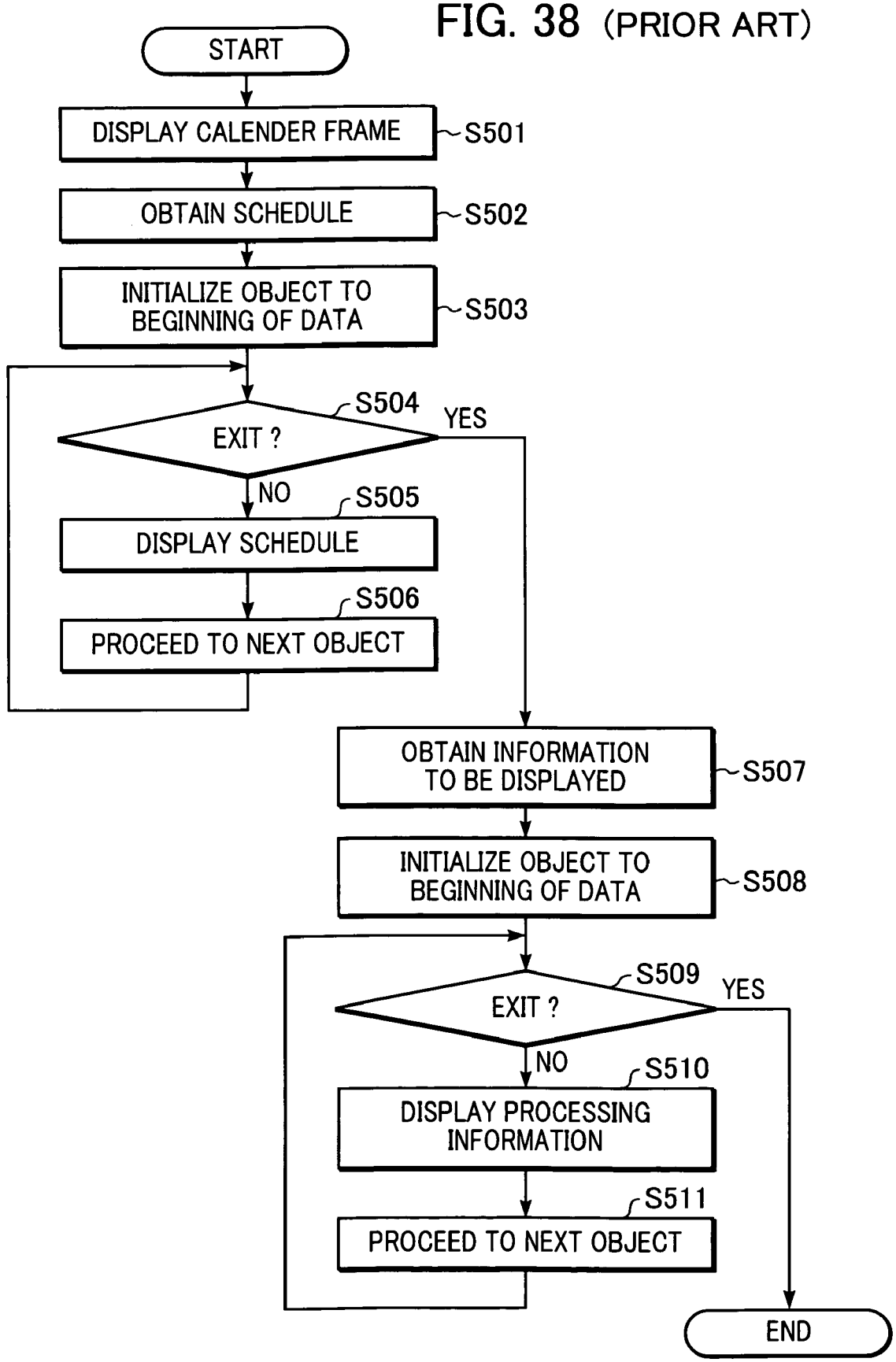
FIG. 38 is a flowchart showing a conventional scheduler-format displaying process.
Figure 40:
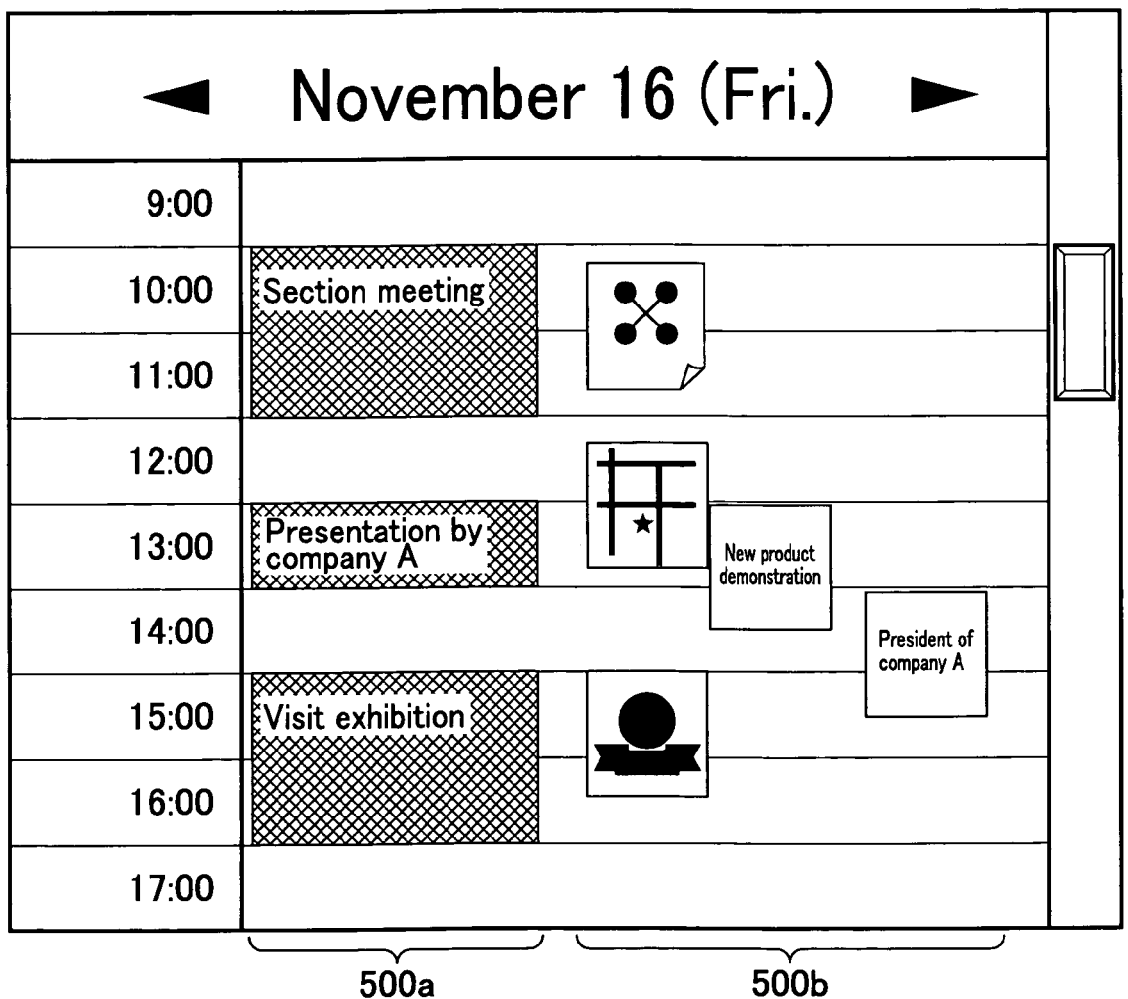
FIG. 40 is an illustration of a screen showing a conventional time-based daily schedule.

FIG. 33 is an illustration showing an example of a screen showing time-based daily schedule in accordance with the seventh embodiment. The screen shows a schedule summary 50a and data 50f in relation to periods. In the display screen, reduced large-volume data 50g is displayed in a size smaller than a size of other data.

As described above, according to the seventh embodiment, even when a large volume of data is displayed in a limited display area in which the number of data items that can be displayed at once is restricted, rough searching for data is facilitated. Furthermore, a user having good eyesight is allowed to identify a specific data item when a screen having a high resolution is used.

By storing programs according to the flowcharts shown in FIGS. 2 to 7, 12 to 15, 17 to 18, 20 to 21, 23 to 24, 26, 28, 29, and 32 in the program memory and running the programs, the control methods according to the embodiments described above can be implemented.

The present invention can be applied to a system composed of a plurality of apparatuses (e.g., host computers, interface devices, readers, and printers), or to an individual apparatus (e.g., a copying machine, a facsimile machine, or the like).

It is to be understood that a storage medium storing program code implementing software may be supplied for achieving the functions of the embodiments described above to a system or an apparatus so that a computer (or a CPU or an MPU (micro-processing unit)) of the system or the apparatus can read and execute the program code stored in the storage medium.

In that case, the program code read from the storage medium achieves the functions of the embodiments described above.

The storage medium for supplying the program code may be, for example, a floppy disk, a hard disk, an optical disk, a magneto-optical disk, a Compact Disk-Read Only Memory (CD-ROM), a Compact Disk-Recordable (CD-R), a magnetic tape, a non-volatile memory card, or a ROM.

Furthermore, instead of executing the program code read by the computer, the functions of the embodiments described above may be achieved by causing an operating system (OS) or the like running on the computer to execute part of or the entire processing according to instructions of the program code.

Furthermore, it is to be understood that the functions of the embodiments described above may be achieved by writing the program code read from the storage medium to a memory of a functional extension board mounted on the computer or a functional extension unit connected to the computer so that a CPU or the like of the functional extension board or the functional extension unit will execute part of or the entire processing according to instructions of the program code.

When the present invention is implemented in the form of the storage medium, the storage medium stores program code corresponding to the flowcharts described above with reference to the drawings.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   determining means for determining whether the number of data items to be displayed in a same display position in a display area segmented for a respective time axis with a same width per unit time is less than or equal to the number of data items that can be displayed in the display position;

first displaying means for displaying the data items in the display area, in a first display mode such that all the determined data items can be recognized, when the determining means determines that the number of data items to be displayed in the display position is less than or equal to the number of data items that can be displayed;

second displaying means for displaying the determined data items that would otherwise be displayed in the first mode in a second mode, such that the determined data items are displayed in a reduced size or in an overlapped manner in the display area when the determining means determines that the number of data items to be displayed in the display position is greater than the number of data items that can be displayed;

specifying means for specifying a data item displayed in the first mode or the second mode; and data-list displaying means for displaying a list of the data items in a pop-up window, such that all of the determined data items that are displayed in the second mode, which are specified by the specifying means, and which would otherwise be displayed in the first mode, can be simultaneously displayed so as to be individually recognizable in the pop-up window, at the same time that the determined data items are displayed in the display area segmented for a respective time axis by the first displaying means or the second displaying means, when the specifying means specifies the data item displayed by the second displaying means, wherein the data-list displaying means displays a scrollbar in the pop-up window.

2. An information processing apparatus according to claim 1, wherein the second display mode is an overlap display mode and the second displaying means displays the data items in the display area in an overlapped manner when the number of data items to be displayed is greater than the number of data items that can be displayed.

3. An information processing apparatus according to claim 1, further comprising display-size determining means for determining the reduced display size for the data items.

4. An information processing apparatus according to claim 1, further comprising display-order specifying means for specifying a display order of the data items displayed, wherein the data items are displayed by the first displaying means or the second displaying means in the display order specified by the display-order specifying means.

5. An information processing apparatus according to claim 1, wherein the pop-up window includes a display-maintaining-instruction button for specifying whether to maintain displaying the pop-up window.

6. An information processing apparatus according to claim 1, further comprising: a data-list display specifying means for specifying the data items displayed by the data-list displaying means.

7. A data display method, comprising:

determining whether the number of data items to be displayed in a same display position in a display area segmented for a respective time axis with a same width per unit time is less than or equal to the number of data items that can be displayed in the display position;

displaying the data items in the display area, in a first display mode such that all the determined data items can be recognized, when the number of data items to be displayed in the display position is determined to be less than or equal to the number of data items that can be displayed;

displaying the determined data items that would otherwise be displayed in the first mode in a second mode, such that the determined data items are displayed in a reduced size or in an overlapped manner in the display area when the number of data items to be displayed in the display position is determined to be greater than the number of data items that can be displayed;

specifying a data item displayed in the first mode or the second mode; and displaying a list of the data items in a pop-up window, such that all of the determined data items that are displayed in the second mode, which are specified, and which would otherwise be displayed in the first mode, can be simultaneously displayed so as to be individually recognizable in the pop-up window, at the same time that the determined data items are displayed in the display area segmented for a respective time axis in the first display mode or the second displaying mode, when the data item displayed in the second displaying mode is specified, wherein the list of data items is displayed with a scrollbar in the pop-up window.

8. A computer readable storage medium having computer-executable instructions stored thereon for causing an information processing apparatus to perform a data display method, the computer readable storage medium comprising:

computer-executable instructions for determining whether the number of data items to be displayed in a same display position in a display area segmented for a respective time axis with a same width per unit time is less than or equal to the number of data items that can be displayed in the display position;

computer-executable instructions for displaying the data items in the display area, in a first display mode such that all the determined data items can be recognized, when the number of data items to be displayed in the display position is determined to be less than or equal to the number of data items that can be displayed;

computer-executable instructions for displaying the determined data items that would otherwise be displayed in the first mode in a second mode, such that the determined data items are displayed in a reduced size or in an overlapped manner in the display area when the number of data items to be displayed in the display position is determined to be greater than the number of data items that can be displayed;

computer-executable instructions for specifying a data item displayed in the first mode or the second mode; and computer-executable instructions for displaying a list of the data items in a pop-up window, such that all of the determined data items that are displayed in the second mode, which are specified, and which would otherwise be displayed in the first mode, can be simultaneously displayed so as to be individually recognizable in the pop-up window, at the same time that the determined data items are displayed in the display area segmented for a respective time axis in the first display mode or the second displaying mode, when the data item displayed in the second displaying mode is specified, wherein the list of data items is displayed with a scrollbar in the pop-up window.

* * * * *